(12) United States Patent
Hong et al.

(10) Patent No.: US 12,061,344 B2
(45) Date of Patent: Aug. 13, 2024

(54) ELECTRONIC DEVICE FOR CONTROLLING WEARABLE DEVICE BASED ON INPUT OF ELECTRONIC DEVICE AND METHOD THEREOF

(71) Applicant: Samsung Electronics Co., Ltd., Suwon-si (KR)

(72) Inventors: Seungseok Hong, Suwon-si (KR); Hyunsoo Kim, Suwon-si (KR); Seungbum Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/328,386

(22) Filed: Jun. 2, 2023

(65) Prior Publication Data
US 2024/0069351 A1    Feb. 29, 2024

Related U.S. Application Data

(63) Continuation of application No. PCT/KR2023/007110, filed on May 24, 2023.

(30) Foreign Application Priority Data

Aug. 29, 2022 (KR) .................. 10-2022-0108750
Oct. 11, 2022 (KR) .................. 10-2022-0130118

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/013* (2013.01); *G06F 3/04812* (2013.01); *G06F 3/04883* (2013.01); *G02B 2027/0123* (2013.01)

(58) Field of Classification Search
CPC ........ G02B 27/0172; G02B 2027/0123; G06F 3/013; G06F 3/04812; G06F 3/04883
See application file for complete search history.

(56) References Cited

U.S. PATENT DOCUMENTS 10,338,673 B2    7/2019   Chen et al.
10,814,220 B2 *  10/2020  Moon ................. G06F 3/04845
(Continued)

FOREIGN PATENT DOCUMENTS

CN     113238708 A    8/2021
JP     2019128693 A   8/2019
(Continued)

OTHER PUBLICATIONS

International Search Report and Written Opinion for International Application No. PCT/KR2023/007110; International Filing Date May 24, 2023; Date of Mailing Sep. 7, 2023, 11 Pages.

*Primary Examiner* — Michael Pervan
(74) *Attorney, Agent, or Firm* — CANTOR COLBURN LLP

(57) ABSTRACT

A processor of an electronic device displays, by controlling a wearable device, a portion of a first screen in an FoV of the wearable device and displays a second screen within a displaying area of the display of the electronic device. In a first state identifying a reference position to be displayed within the FoV based on first information received from the wearable device and for identifying the reference position of the pointer in the FoV, the processor obtains the position of the pointer in the FoV, based on the reference position and a position of a contact point of a touch input on the second screen. The processor obtains a position of the pointer in the FoV based on the position of the contact point within a second state and transmits second information for displaying the pointer in the first screen to wearable device based on the obtained position.

20 Claims, 23 Drawing Sheets

(51) Int. Cl.
*G06F 3/04812* (2022.01)
*G06F 3/04883* (2022.01)

(56) References Cited

U.S. PATENT DOCUMENTS

| | | | |
|---|---|---|---|
| 10,901,531 B2 * | 1/2021 | Lee | G06F 3/04815 |
| 10,950,205 B2 | 3/2021 | Lee et al. | |
| 10,976,836 B2 | 4/2021 | Nishizawa | |
| 11,340,460 B2 | 5/2022 | Muldoon et al. | |
| 2014/0152558 A1 | 6/2014 | Salter et al. | |
| 2017/0293351 A1 | 10/2017 | Li | |
| 2018/0321493 A1 | 11/2018 | Kim et al. | |
| 2019/0060742 A1 * | 2/2019 | Moon | G06F 3/014 |
| 2019/0073109 A1 | 3/2019 | Zhang et al. | |
| 2019/0079599 A1 * | 3/2019 | Lee | G06F 3/0346 |
| 2020/0104043 A1 | 4/2020 | Huang | |
| 2020/0201515 A1 | 6/2020 | Moon et al. | |
| 2022/0197394 A1 | 6/2022 | Ha et al. | |
| 2023/0128520 A1 | 4/2023 | Rho et al. | |

FOREIGN PATENT DOCUMENTS

| | | |
|---|---|---|
| KR | 20150092165 A | 8/2015 |
| KR | 20150098960 A | 8/2015 |
| KR | 20170058756 A | 5/2017 |
| KR | 20200061930 A | 6/2020 |
| KR | 20200076449 A | 6/2020 |
| KR | 20220003254 A | 1/2022 |

\* cited by examiner

ELECTRONIC DEVICE FOR CONTROLLING WEARABLE DEVICE BASED ON INPUT OF ELECTRONIC DEVICE AND METHOD THEREOF

CROSS-REFERENCE TO RELATED APPLICATION(S)

This application is a continuation of PCT International Application No. PCT/KR2023/007110, which was filed on May 24, 2023, and claims priority to Korean Patent Application No. 10-2022-0108750, filed on Aug. 29, 2022, in the Korean Intellectual Property Office, and claims priority to Korean Patent Application No. 10-2022-0130118, filed on Oct. 11, 2022, in the Korean Intellectual Property Office, the disclosure of which are incorporated by reference herein their entirety.

BACKGROUND

Technical Field

The present disclosure relates to an electronic device for controlling a wearable device based on an input of the electronic device and a method thereof.

Description of Related Art

In order to provide an enhanced user experience, an electronic device that provides an augmented reality (AR) service that displays information generated by a computer in association with an external object in the real-world, a virtual reality (VR) service for providing an immersive user experience for a virtual world, and/or a mixed reality (MR) service is being developed. The electronic device may be a wearable device that is worn by a user. For example, the electronic device may be an AR glasses and/or a head-mounted device (HMD).

SUMMARY

According to an embodiment, an electronic device may comprise a communication circuitry, a display, and a processor. The processor may be configured to display, by controlling a wearable device identified through the communication circuitry, at least a portion of a first screen in a field-of-view (FoV) of the wearable device. The processor may be configured to display, while identifying that the at least the portion of the first screen is displayed by the wearable device, a second screen for receiving a touch input associated with the first screen in a displaying area of the display. The processor may be configured to receive first information for identifying a reference position of a pointer in the FoV from the wearable device. The processor may be configured to obtain, in a first state identifying the reference position based on the received first information, a position of the pointer in the FoV based on the reference position and a position of a contact point of the touch input on the second screen. The processor may be configured to obtain, in a second state different from the first state, a position of the pointer in the FoV based on the position of the contact point. The processor may be configured to transmit, to the wearable device, second information for displaying the pointer in the first screen in the FoV based on the obtained position.

According to an embodiment, a method of an electronic device may comprise displaying, by controlling a wearable device identified through a communication circuitry in the electronic device, at least a portion of a first screen in a field-of-view (FoV) of the wearable device. The method may comprise displaying, while identifying that the at least the portion of the first screen is displayed by the wearable device, a second screen for receiving a touch input associated with the first screen in a displaying area of a display of the electronic device. The method may comprise receiving first information for identifying a reference position of a pointer in the FoV from the wearable device. The method may comprise obtaining, in a first state identifying the reference position based on the received first information, a position of the pointer in the FoV based on the reference position and a position of a contact point of the touch input on the second screen. The method may comprise obtaining, in a second state different from the first state, a position of the pointer in the FoV based on the position of the contact point. The method may comprise transmitting, to the wearable device, second information for displaying the pointer in the first screen in the FoV based on the obtained position.

According to an embodiment, a method of an electronic device may comprise executing, based on identifying a wearable device in a predetermined state through a communication circuitry in the electronic device, a preset mode for displaying a screen in a field-of-view (FoV) of the wearable device based on the electronic device. The method may comprise receiving, based on execution of the preset mode, information associated with the FoV from the wearable device. The method may comprise transmitting, to the wearable device by using a communication link established between the electronic device and the wearable device through the communication circuitry, the screen at least based on the received information. The method may comprise, in a state transmitting the screen to the wearable device, receiving, based on a touch input on a displaying area of a display in the electronic device, an input indicating to modify the screen that is transmitted through the communication link. The method may comprise modifying, based on receiving the input indicating to display a preset screen, the screen that is transmitted through the communication link to the preset screen indicated by the input. The method may comprise combining, based on receiving the input indicating to display a pointer in the screen, the pointer and the screen based on a position of a contact point of the touch input associated with the input, and the received information.

According to an embodiment, an electronic device may comprise a communication circuitry, a display, and a processor. The processor may be configured to execute, based on identifying a wearable device in a predetermined state through the communication circuitry, a preset mode for displaying a screen in a field-of-view, FoV, of the wearable device based on the electronic device. The processor may be configured to receive, based on execution of the preset mode, information associated with the FoV from the wearable device. The processor may be configured to transmit, to the wearable device, the screen at least based on the received information by using a communication link established between the electronic device and the wearable device through the communication circuitry. The processor may be configured to receive, in a state transmitting the screen to the wearable device, an input indicating to modify the screen transmitted through the communication link based on a touch input on a displaying area of the display. The processor may be configured to modify, based on receiving the input indicating to display the preset screen, the screen transmitted through the communication link to the preset screen indicated by the input. The processor may be configured to combine, based on receiving the input indicating to display the pointer in the screen, the pointer and the screen based on a position of contact point of the touch input associated with the input and the received information.

DETAILED DESCRIPTION

Figure 1:
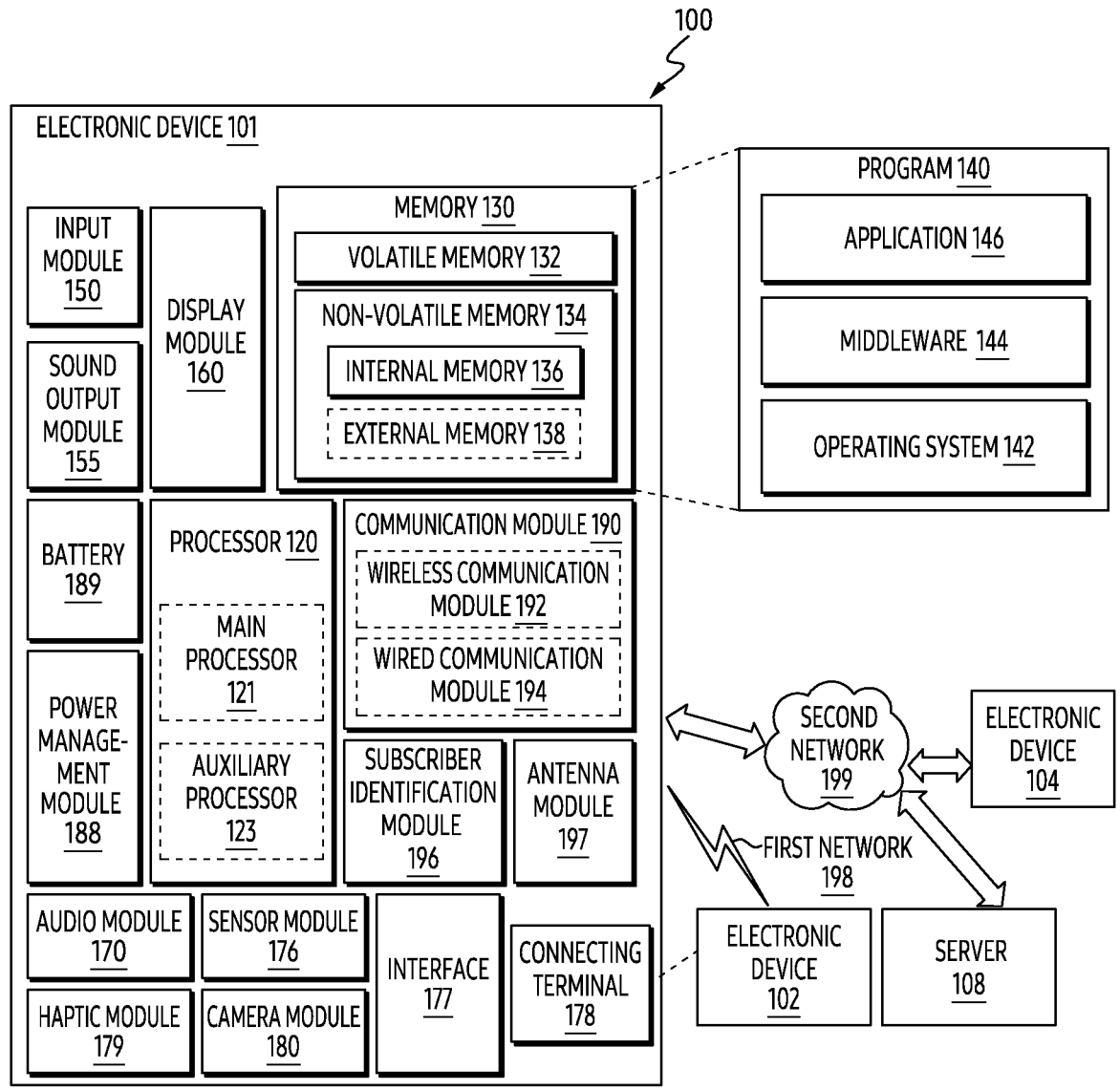
FIG. 1 is a block diagram of an electronic device in a network environment according to various embodiments.

Hereinafter, various embodiments of the present document will be described with reference to the accompanying drawings.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "the first", "the second", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
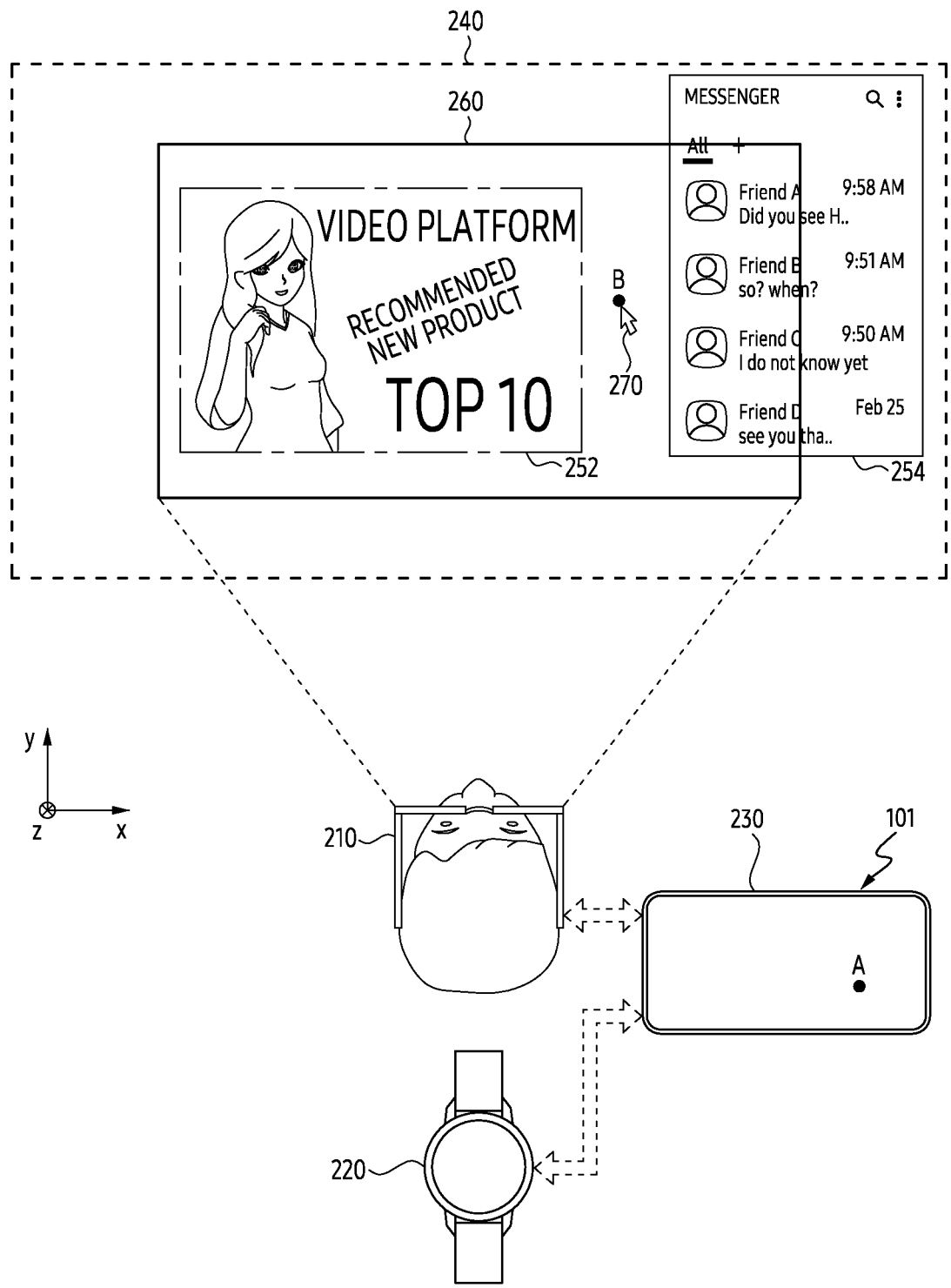
FIG. 2 illustrates an example of a user interface (UI) provided by an electronic device by using a field-of-view (FoV) of a wearable device according to an embodiment.

FIG. 2 illustrates an example of a user interface (UI) provided by an electronic device 101 by using a field-of-view (FoV) 260 of a wearable device 210 according to an embodiment. The electronic device 101 of FIG. 2 may be an example of the electronic device 101 of FIG. 1. The electronic device 101 according to an embodiment may be a terminal owned by a user. The terminal may include, for example, a personal computer (PC) such as a laptop and a desktop, a smartphone, a smart pad, and/or a tablet PC.

Referring to FIG. 2, the electronic device 101 according to an embodiment may be connected to the wearable device 210. For example, the wearable device 210 may be referred to as a head-mounted display (HMD) wearable on a user's head. For example, a housing of the wearable device 210 may include flexible materials such as rubber and/or silicon having a form that closely contacts to a part of the user's head (e.g., a part of the face covering both eyes). For example, the housing of the wearable device 210 may include one or more straps capable of being twined or looped around the user's head. In an embodiment, the wearable device 210 may include a sensor that detects whether a state of the wearable device 210 is worn on the user's head. For example, the sensor may include a switch that identifies whether the strap is fastened, included in a hook of the strap, and/or included in a latch of the strap. An example of a structure of the wearable device 210 will be described with reference to FIGS. 3A and 3B and/or FIGS. 4A and 4B. An example of hardware included in the electronic device 101 connected to the wearable device 210 will be described with reference to FIG. 5.

According to an embodiment, the electronic device 101 may provide a user experience (UX) based on at least one of an augmented reality (AR), a virtual reality (VR), or a mixed reality (MR) to a user wearing the wearable device 210 by controlling the wearable device 210. For example, the electronic device 101 may display a screen within a field-of-view (FoV) 260 formed by the wearable device 210, by controlling the wearable device 210. For example, when the user wears the wearable device 210, the user's FoV and the FoV 260 may match, or at least a part of the user's FoV may include the FoV 260 formed by the wearable device 210. According to an embodiment, the electronic device 101 may control the wearable device 210 to display one or more screens provided from one or more applications executed by the electronic device 101 in the FoV 260. Referring to FIG. 2, for example, the electronic device 101 may display at least part of a first window 252 in the FoV 260 based on the execution of a first application for streaming video. For example, the electronic device 101 may display at least part of a second window 254 in the FoV 260 based on the execution of a second application for exchanging messengers.

According to an embodiment, in a state connected to the wearable device 210, the electronic device 101 may modify a screen displayed in the FoV 260 by using different information received from the electronic device 101 and the wearable device 210. For example, the information may include at least one of one or more images or a motion of the wearable device 210 obtained from a touch input on the display 230 of the electronic device 101, a physical button input, and one or more cameras included in the wearable device 210. For example, the electronic device 101 may identify the motion of the wearable device 210 identified based on the sensor in the wearable device 210. For example, the motion of the wearable device 210 may indicate a motion of a head of a user wearing the wearable device 210. According to an embodiment, the electronic device 101 may select a part corresponding to the FoV 260 within an area 240 having a size exceeding the FoV 260 based on the motion of the wearable device 210. For example, the area 240 may be an area set by the electronic device 101 to display screens received from applications executed by the electronic device 101. Although the rectangular area 240 is illustrated, the size and/or shape of the area 240 may be modified based on the motion of the wearable device 210. For example, the first window 252 and the second window 254 provided from applications executed by the electronic device 101 may be disposed in the area 240. In an embodiment, since the electronic device 101 selects different parts within the area 240 and provides them to the FoV 260 of the wearable device 210, the electronic device 101 may provide a user experience of browsing the area 240 based on the motion of the wearable device 210.

According to an embodiment, the electronic device 101 may identify a point focused by the user within the FoV 260 based on the information received from the wearable device 210. For example, the electronic device 101 may obtain an image of the external space of the wearable device 210 captured along a preset one direction, by using the camera of the wearable device 210 disposed to face the preset one direction (e.g., a direction of the wearable device 210 parallel to a direction in which the face of the user wearing the wearable device 210 faces) within the wearable device 210. Based on the image, the electronic device 101 may identify an external object (e.g., a preset body part such as a hand of the user) disposed in the external space. Based on the position in the image of the external object, the electronic device 101 may identify the point identified by the user. For example, the electronic device 101 may obtain another image capturing pupil of the user by using another camera of the wearable device 210 disposed along a direction toward the pupil of the user wearing the wearable device 210. Based on the other image, the electronic device 101 may identify a direction of gaze of the user within the FoV 260. Based on the identified direction, the electronic device 101 may identify the point focused by the user. According to an embodiment, the electronic device 101 may process the information obtained by the wearable device 210. For example, since the electronic device 101 processes the information, the wearable device 210 does not have to process the information. Since the wearable device 210 does not have to process the information, the amount of computation, current consumption, and/or heat generation of the wearable device 210 can be reduced.

According to an embodiment, the electronic device 101 may modify the screen displayed in the FoV 260 based on an input received through the display 230 in the electronic device 101. An example of a user interface (UI) displayed by the electronic device 101 through the display 230 while modifying the screen displayed in the FoV 260 by controlling the wearable device 210 will be described with reference to FIGS. 6A, 6B, and 6C. According to an embodiment, the electronic device 101 may control the wearable device 210 based on a gesture performed on the display 230. For example, the electronic device 101 may control the wearable device 210 based on the gesture to modify the screen displayed in the FoV 260. For example, the gesture may include a pre-registered gesture by the user to display a preset screen within the FoV 260. For example, in response to identifying the registered gesture, the electronic device 101 may display a preset screen within the FoV 260. According to an embodiment, an example of an operation performed by the electronic device 101 based on a registered gesture will be described with reference to FIGS. 7A and 7B.

In an embodiment, the electronic device 101 may modify the screen displayed in the FoV 260 based on a touch input for point A on the displaying area of the display 230. Referring to FIG. 2, an embodiment in which the electronic device 101 displays a pointer 270 within point B of the FoV 260 in response to the touch input with respect to the A point is illustrated. For example, the pointer 270, such as a cursor, may be displayed by the electronic device 101 to support interaction between the user and the electronic device 101 based on the screen displayed in the FoV 260. Although an example of the pointer 270 having an arrow shape is illustrated, an embodiment is not limited thereto. An operation in which the electronic device 101 identifies the point B within the FoV 260 where the pointer 270 is displayed based on the touch input with respect to the point A on the displaying area of the display 230 will be described with reference to FIGS. 8A, 8B, and 8C. The relationship between the point A and the point B may be related to information identified by the electronic device 101 through the wearable device 210 in a state of receiving the touch input for point A. For example, in a state of identifying a point focused by the user within the FoV 260 based on the information received from the wearable device 210, the electronic device 101 may display the pointer 270 on the point (e.g., a point focused by the user) in the FoV 260, independent of coordinate values of the point A in the displaying area of the display 230. According to an embodiment, in a state in which a point focused by the user is not identified from the wearable device 210, the electronic device 101 may obtain coordinate values of the point B where the pointer 270 will be displayed based on the coordinate values of the point A in the displaying area of the display 230.

According to an embodiment, the electronic device 101 may control the wearable device 210 based on information received from the external electronic device 220 connected to the electronic device 101. Referring to FIG. 2, an example of the external electronic device 220 having a form factor (e.g., size, shape, physical attributes, etc.) related to smart accessories such as a smart watch is illustrated, but the embodiment is not limited thereto. For example, the electronic device 101 may modify a screen displayed in the FoV 260 based on the information received from the external electronic device 220. For example, the information may include information indicating the motion of the external electronic device 220 and/or the touch input performed on the display of the external electronic device 220. For example, the information may indicate an input related to the z-axis, which is perpendicular to both the x-axis and the y-axis within the FoV 260. According to an embodiment, an example of the electronic device 101 modifying the screen displayed within the FoV 260 based on the information received from the external electronic device 220 will be described with reference to FIG. 9.

As described above, according to an embodiment, the electronic device 101 may display a screen in the FoV 260 to provide a user experience related to augmented reality, virtual reality, and/or mixed reality by controlling the wearable device 210. An exemplary case in which the electronic device 101 provides the user experience will be described with reference to FIGS. 10A, 10B, and 10C. According to an embodiment, the electronic device 101 may generate a screen to be displayed in the FoV 260 based on information identified from the wearable device 210 and information identified from the electronic device 101. The electronic device 101 may transmit information for displaying the screen to the wearable device 210. For example, the electronic device 101 may cause the wearable devices 210 to display a screen within the FoV 260 based on the information. Based on the generation of the screen by the electronic device 101, the amount of computation of the wearable device 210 required to generate the screen may be reduced. Since the amount of computation of the wearable device 210 is reduced, the heat generation of the wearable device 210 is reduced. Since the amount of computation of the wearable device 210 is reduced, the wearable device 210 can reduce power consumption.

Hereinafter, referring to FIGS. 3A and 3B and/or FIGS. 4A and 4B, a structure of the wearable device 210 connected to the electronic device 101 according to an embodiment will be described.

Figure 3A:
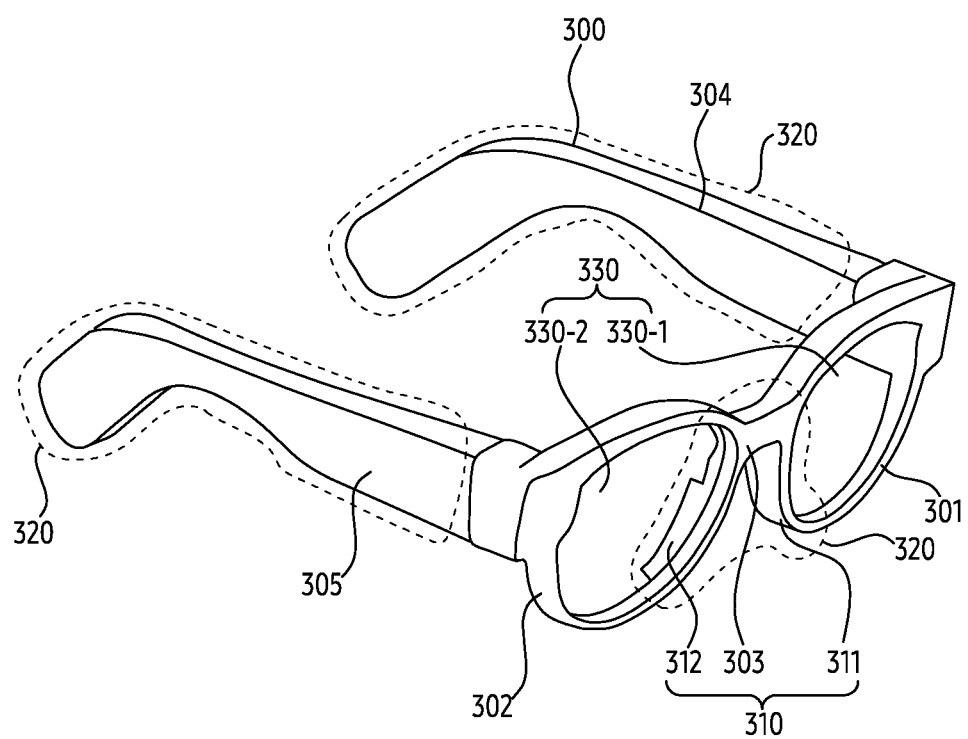
FIG. 3A illustrates an example of a perspective view of a wearable device according to an embodiment.

FIG. 3A illustrates an example of a perspective view of a wearable device 210 according to an embodiment. FIG. 3B illustrates an example of one or more hardware disposed in a wearable device 210 according to an embodiment. The wearable device 210 of FIGS. 3A and 3B may be an example of the wearable device 210 of FIG. 2. Referring to FIG. 3A, according to an embodiment, the wearable device 210 may include at least one display 350 and a frame 300 supporting the at least one display 350. The structure of the wearable device 210 in FIGS. 3A and 3B is exemplary, and a position of each of hardware and/or circuits included in the wearable device 210 is not limited to the embodiment of FIGS. 3A and 3B.

According to an embodiment, the wearable device 210 may be worn on a part of the user's body. The wearable device 210 may provide augmented reality (AR), virtual reality (VR), and/or mixed reality (MR) combining the augmented reality and the virtual reality to a user wearing the wearable device 210. For example, the wearable device 210 may display a virtual reality image provided by at least one optical device 382 and 384 of FIG. 3B on at least one display 350 in response to the user's preset gesture obtained through a gesture recognition camera 360-2 of FIG. 3B.

According to an embodiment, the at least one display 350 may provide visual information to a user. For example, the at least one display 350 may include a transparent or translucent lens (e.g., lenses 350 in FIG. 3A including a lens 330-1 corresponding to a left eye and a lens 330-2 corresponding to a right eye). The at least one display 350 may include a first display 350-1 and/or a second display 350-2 spaced apart from the first display 350-1. For example, the first display 350-1 and the second display 350-2 may be disposed at positions corresponding to the user's left and right eyes, respectively.

Figure 3B:
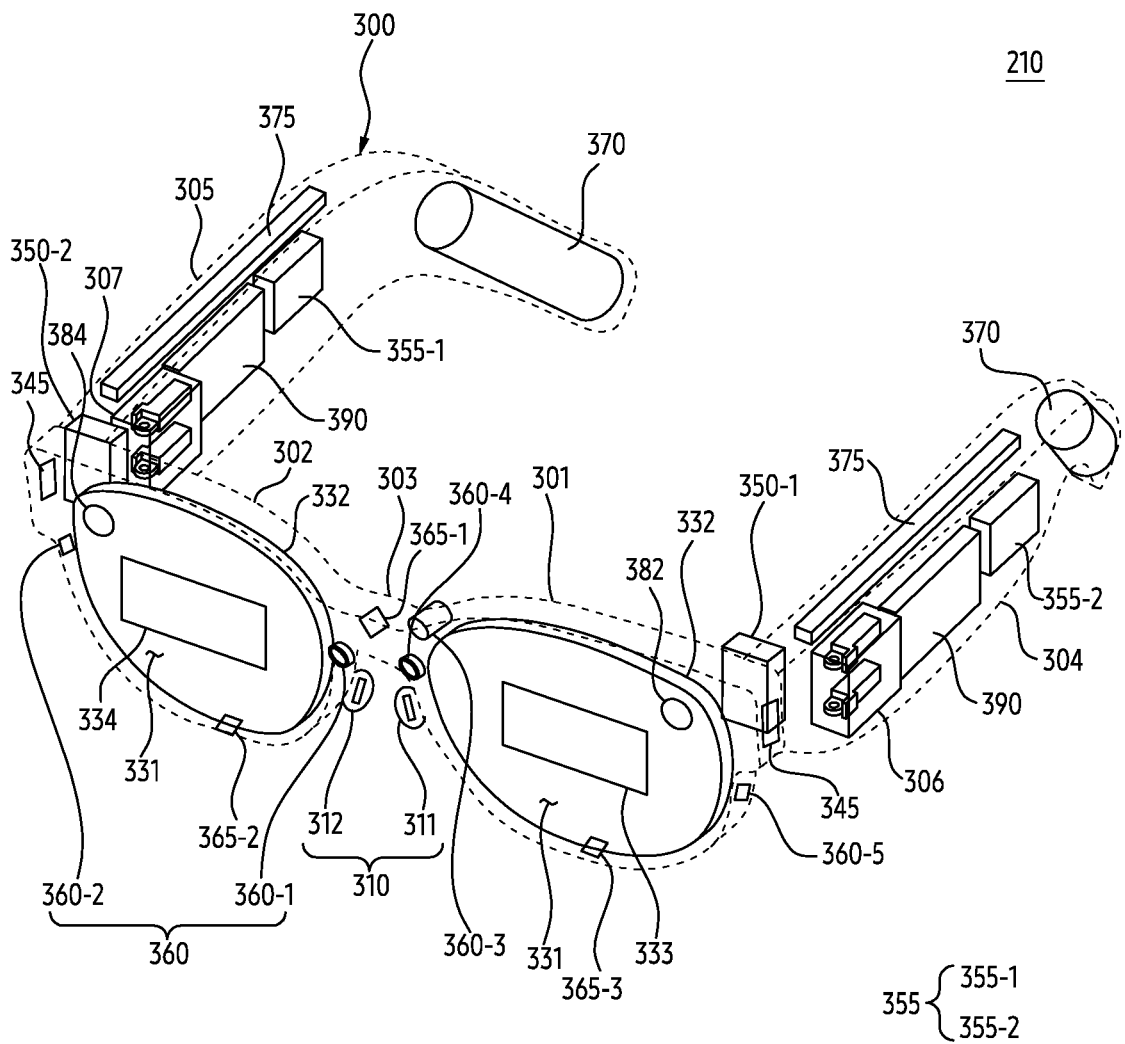
FIG. 3B illustrates an example of one or more hardware disposed in a wearable device according to an embodiment.

Referring to FIG. 3B, the at least one display 350 may provide visual information transmitted from external light to the user through a lens included in the at least one display 350 and other visual information distinguished from the visual information. The lens may be formed based on at least one of a fresnel lens, a pancake lens, or a multi-channel lens. For example, the at least one display 350 may include a first surface 331 and a second surface 332 opposite to the first surface 331. For example, a displaying area may be formed on the second surface 332 of the at least one display 350. When a user wears the wearable device 210, external light may be transmitted to the user by entering the first surface 331 and passing through the second surface 332. For another example, the at least one display 350 may display an augmented reality image in which a virtual reality image provided by at least one optical device 382 and 384 is combined with a reality screen transmitted through the external light on a displaying area formed on the second surface 332.

In an embodiment, the at least one display 350 may include waveguides 333 and 334 that diffract light transmitted from the at least one optical device 382 and 384 and transmit it to the user. For example, the waveguides 333 and 334 may be formed based on at least one of glass, plastic, or polymer. For example, a nano pattern may be formed on at least a part of the outside or inside of the waveguides 333 and 334. For example, the nano pattern may be formed based on a polygonal and/or curved grating structure. Light incident on one end of the waveguides 333 and 334 may be propagated to another end of the waveguides 333 and 334 by the nano pattern. The waveguides 333 and 334 may include at least one of a diffraction element (e.g., a diffractive optical element (DOE), a holographic optical element (HOE)), and a reflection element (e.g., a reflective mirror). For example, the at least one waveguides 333 and 334 may be disposed in the wearable device 210 to guide a screen displayed by the at least one display 350 to the user's eyes. For example, the screen may be transmitted to the user's eyes based on total internal reflection (TIR) generated within the waveguides 333 and 334.

According to an embodiment, the wearable devices 210 may analyze an object included in the real image collected through a photographing camera 360-3 and combine a virtual object corresponding to an object subject to augmented reality provisioning among analyzed objects, in order to display on the at least one display 350. For example, the virtual object may include at least one of text and an image for various information related to the object included in the real image. In an embodiment, the wearable device 210 may analyze the object based on a multi-camera such as a stereo camera. For example, for analyzing the object, the wearable device 210 may execute time-of-flight (ToF) and/or simultaneous localization and mapping (SLAM) supported by a multi-camera. A user wearing the wearable device 210 may view an image displayed on at least one display 350.

According to an embodiment, the frame 300 may have a physical structure in which the wearable device 210 may be worn on the user's body. According to an embodiment, when the user wears the wearable device 210, the frame 300 may be configured such that the first display 350-1 and the second display 350-2 may be positioned at positions corresponding to the user's left and right eyes. The frame 300 may support at least one display 350. For example, the frame 300 may support the first display 350-1 and the second display 350-2 to be positioned at the position corresponding to the user's left and right eyes.

Referring to FIG. 3A, when a user wears a wearable device 210, the frame 300 may include an area 320 in which at least a part thereof contacts a part of the user's body. For example, the area 320 in contact with a part of the user's body of frame 300 may include an area in contact with a part of the user's nose, a part of the user's ear, and a part of the side surface of the user's face in contact with the wearable device 210. According to an embodiment, the frame 300 may include a nose pad 310 in contact with a part of the user's body. When the wearable device 210 is worn by the user, the nose pad 310 may contact a part of the user's nose. For example, the frame 300 may include a first temple 304 and a second temple 305 in contact with another part of the user's body, which is distinguished from the part (e.g., the nose) of the user's body.

For example, the frame 300 may include a first rim 301 surrounding at least a part of the first display 350-1, a second rim 302 surrounding at least a part of the second display 350-2, a bridge 303 disposed between the first rim 301 and the second rim 302, a first pad 311 disposed along a part of the edge of the first rim 301 from one end of the bridge 303, a second pad 312 disposed along a part of the edge of the second rim 302 from another end of the bridge 303, a first temple 304 extending from the first rim 301 and fixed to a part of the wearer's ear, and/or a second temple 305 extending from the second rim 302 and fixed to a part of the opposite ear of the wearer's above ear. The first pad 311 and the second pad 312 may be in contact with a part of the user's nose. The first temple 304 and the second temple 305 may be in contact with a part of the user's face and a part of the ear. For example, the temples 304 and 305 may be rotatably connected to the rim through hinge units 306 and 307 of FIG. 3B. In an embodiment, the first temple 304 may be rotatably connected to the first rim 301 through the first hinge unit 306 disposed between the first rim 301 and the first temple 304. The second temple 305 may be rotatably connected to the second rim 302 through the second hinge unit 307 disposed between the second rim 302 and the second temple 305.

According to an embodiment, the wearable device 210 may identify an external object (e.g., a user's fingertip) that touches the frame 300 using a touch sensor, a grip sensor, and/or a proximity sensor formed on at least a part of the surface of the frame 300, and/or a gesture performed by the external object.

According to an embodiment, the wearable device 210 may include hardware performing various functions. For example, the hardware may include a battery module 370, an antenna module 375, at least one optical device 382 and 384, speakers (e.g., speakers 355-1, 355-2), microphones (e.g., microphones 365-1, 365-2, 365-3), a light emitting module (not shown), and/or a printed circuit board 390. Various hardware may be disposed within the frame 300.

According to an embodiment, the microphone (e.g., microphones 365-1, 365-2, 365-3) of the wearable device 210 may be disposed on at least a part of the frame 300 to obtain a sound signal. For example, the first microphone 365-1 disposed on the nose pad 310, the second microphone 365-2 disposed on the second rim 302, and the third microphone 365-3 disposed on the first rim 301 are illustrated in FIG. 3B, but the number and arrangement of microphones 365 are not limited to the embodiment of FIG. 3B. When the number of microphones 365 included in the wearable device 210 is two or more, the wearable device 210 may identify a direction of the sound signal using a plurality of microphones disposed on different parts of the frame 300.

According to an embodiment, the electronic device 101 may transmit a virtual object transmitted from at least one display to at least one waveguide 333 and 334. For example, at least one optical device 382 and 384 may be a projector. The at least one optical device 382 and 384 may be disposed adjacent to the at least one display 350 or may be included in the at least one display 350 as a part of the at least one display 350. According to an embodiment, the wearable device 210 may include the first optical device 382 corresponding to the first display 350-1 and a second optical device 384 corresponding to the second display 350-2. For example, the first optical device 382 can be disposed on the edge of the first display 350-1, and the second optical device 384 can be disposed on the edge of the second display 350-2. The first optical device 382 may transmit light to the first waveguide 333 disposed on the first display 350-1. The second optical device 384 may transmit light to the second waveguide 334 disposed on the second display 350-2.

In an embodiment, the camera 360 may include the photographing camera 360-3, eye tracking cameras (ET CAM) 360-1 and 360-4, and/or gesture recognition cameras 360-2 and 360-5. For example, the photographing camera 360-3, the eye tracking cameras 360-1 and 360-4, and gesture recognition cameras 360-2 and 360-5 may be disposed in different positions on the frame 300 and may perform different functions.

In an embodiment, the photographing camera 360-3 may photograph an actual image or background to be matched with a virtual image in order to implement augmented reality or mixed reality content. The photographing camera 360-3 may photograph an image of a specific object present in the position viewed by the user (e.g., the FoV 260 in FIG. 2) and provide the image to the at least one display 350. The at least one display 350 may display one image in which information on the actual image or background including the image of the specific object obtained using the photographing camera 360-3 is overlapped with a virtual image provided through the at least one optical device 382 and 384. In an embodiment, the photographing camera 360-3 may be disposed on the bridge 303 disposed between the first rim 301 and the second rim 302.

The eye tracking cameras 360-1 and 360-4 may output data indicating the gaze of the user wearing the wearable device 210. For example, the wearable device 210 may detect the gaze from an image including the user's eyes obtained through the eye tracking cameras 360-1 and 360-4. An example in which the eye tracking camera 360-1 is disposed toward the user's right eye is illustrated in FIG. 3B, but the embodiment is not limited thereto, and the eye tracking camera 360-1 may be disposed alone toward the user's left eye or may be disposed toward both eyes. The eye tracking cameras 360-1 and 360-4 are used to realize more realistic augmented reality by matching the user's gaze with visual information provided to the at least one display 350, by tracking the gaze of the user wearing the wearable device 210. For example, when the user views the front, the wearable device 210 may naturally display environmental information related to the front of the user at the place where the user is positioned on the at least one display 350. The eye tracking cameras 360-1 and 360-4 may be configured to capture an image of the user's pupil in order to determine the user's gaze. For example, the eye tracking cameras 360-1 and 360-4 may receive gaze detection light reflected from the user's pupil and track the user's gaze based on the position and movement of the received gaze detection light. In an embodiment, the eye tracking cameras 360-1 and 360-4 may be disposed at the position corresponding to the user's left and right eyes. For example, the eye tracking cameras 360-1 and 360-4 may be disposed to face the user wearing the wearable device 210 within the first rim 301 and/or the second rim 302.

The gesture recognition cameras 360-2 and 360-5 may provide a specific event to the screen provided on the at least one display 350 by recognizing the gesture of all or part of the user's body, such as the user's torso, hand, or face. The gesture recognition cameras 360-2 and 360-5 may obtain a signal corresponding to the gesture by recognizing the user's gesture and provide a display corresponding to the signal to the at least one display 350. The processor may identify a signal corresponding to the gesture and perform a preset function based on the identification. In an embodiment, the gesture recognition cameras 360-2 and 360-5 may be disposed on the first rim 301 and/or the second rim 302.

The camera 360 included in the wearable device 210 is not limited to the aforementioned eye tracking cameras 360-1 and 360-4, or gesture recognition cameras 360-2 and 360-5. For example, the wearable device 210 may identify an external object (e.g., the user's hand wearing the wearable device 210) included in the FoV using the camera 360 disposed toward the user's FoV (e.g., the FoV 260 of FIG. 2). The identification of the external object by the wearable device 210 may be performed based on a sensor for identifying a distance between the wearable device 210 and the external object, such as a depth sensor and/or a time of flight (ToF) sensor. In an embodiment, the camera 360 disposed toward the FoV may support an auto-focus function and/or an optical image stabilization (OIS) function. For example, the wearable device 210 may include the camera 360 (e.g., a face tracking (FT) camera) disposed toward a face in order to obtain an image including the face of the user wearing the wearable device 210.

According to an embodiment, the wearable device 210 may further include a light source (e.g., LED 345) that emits light toward a subject (e.g., the user's eye, face, and/or an external object in the FoV) photographed by using the camera 360. For example, the light source may include an LED having an infrared wavelength. For example, the light source may be disposed on the at least one of the frame 300 and the hinge units 306 and 307.

According to an embodiment, the battery module 370 may supply power to electronic components of the wearable device 210. In an embodiment, the battery module 370 may be disposed in the first temple 304 and/or the second temple 305. For example, the battery module 370 may be a plurality of battery modules 370. For example, the plurality of battery modules 370 may be disposed in each of the first temple 304 and the second temple 305, respectively. In an embodiment, the battery module 370 may be disposed at an end of the first temple 304 and/or the second temple 305.

The antenna module 375 may transmit a signal or power to the outside of the wearable device 210 or receive a signal or power from the outside. In an embodiment, the antenna module 375 may be disposed in the first temple 304 and/or the second temple 305. For example, the antenna module 375 may be disposed close to one surface of the first temple 304 and/or the second temple 305.

The speaker 355 may output a sound signal to the outside of wearable device 210. The sound output module may be referred to as a speaker. In the embodiment, the speaker 355 may be disposed within the first temple 304 and/or the second temple 305 to be disposed adjacent to the ear of the user wearing the wearable device 210. For example, the speaker 355 may include a second speaker 355-2 disposed adjacent to the right ear of the user by being disposed within the first temple 304 and a first speaker 355-1 disposed adjacent to the left ear of the user by being disposed within the second temple 305.

The light emitting module (not shown) may include at least one light emitting element. The light emitting module may emit light of a color corresponding to a specific state or may emit light in an operation corresponding to the specific state, in order to visually provide information on the specific state of the wearable device 210. For example, when charging is required, the wearable device 210 may emit red light at a predetermined period. In an embodiment, the light emitting module may be disposed on the first rim 301 and/or the second rim 302.

Referring to FIG. 3B, according to an embodiment, the wearable device 210 may include a printed circuit board (PCB) 390. For example, the PCB 390 may be included in at least one of the first temple 304 and the second temple 305. For example, the PCB 390 may include an interposer disposed between at least two sub-PCBs. On the PCB 390, one or more hardware included in the wearable device 210 (e.g., hardware illustrated by different blocks in FIG. 5) may be disposed. In an embodiment, the wearable device 210 may include a flexible PCB (FPCB) for interconnecting the hardware.

According to an embodiment, the wearable device 210 may include at least one of a gyro sensor, a gravity sensor, and/or an acceleration sensor to detect the posture of the wearable device 210 and/or the posture of the body part (e.g., head) of the user wearing the wearable device 210. For example, each of the gravity sensor and the acceleration sensor may measure gravity acceleration, and/or acceleration, based on preset 3D axes (e.g., x-axis, y-axis, and z-axis) perpendicular to each other. The gyro sensor may measure an angular velocity of each of the preset 3D axes (e.g., the x-axis, the y-axis, and the z-axis). At least one of the gravity sensor, the acceleration sensor, and the gyro sensor may be referred to as an IMU (inertial measurement unit). According to an embodiment, the wearable device 210 may identify the user's motion and/or gesture performed to execute or stop a specific function of the wearable device 210 based on the IMU.

Figure 4A:
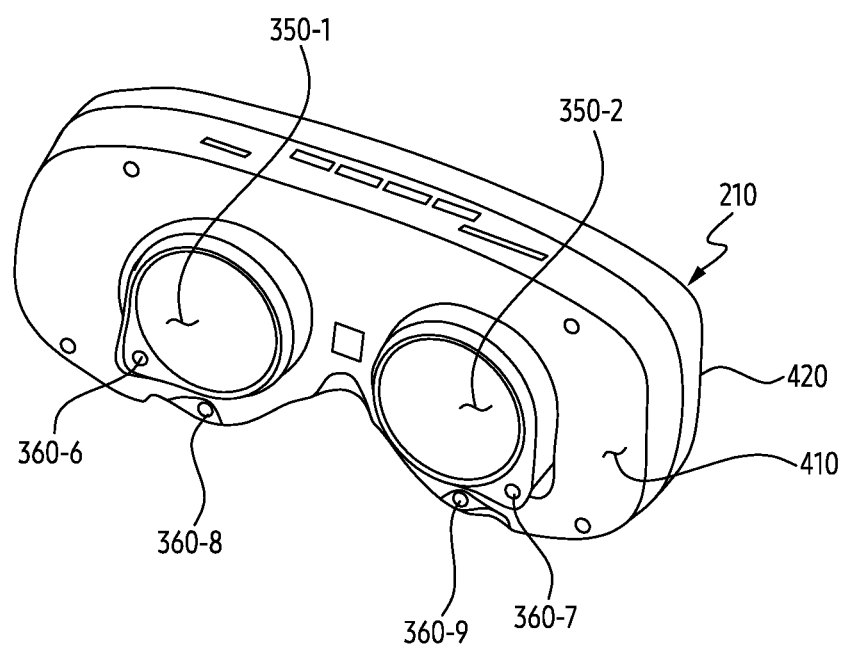
FIGS. 4A and 4B illustrate an example of an appearance of a wearable device according to an embodiment.
Figure 4B:
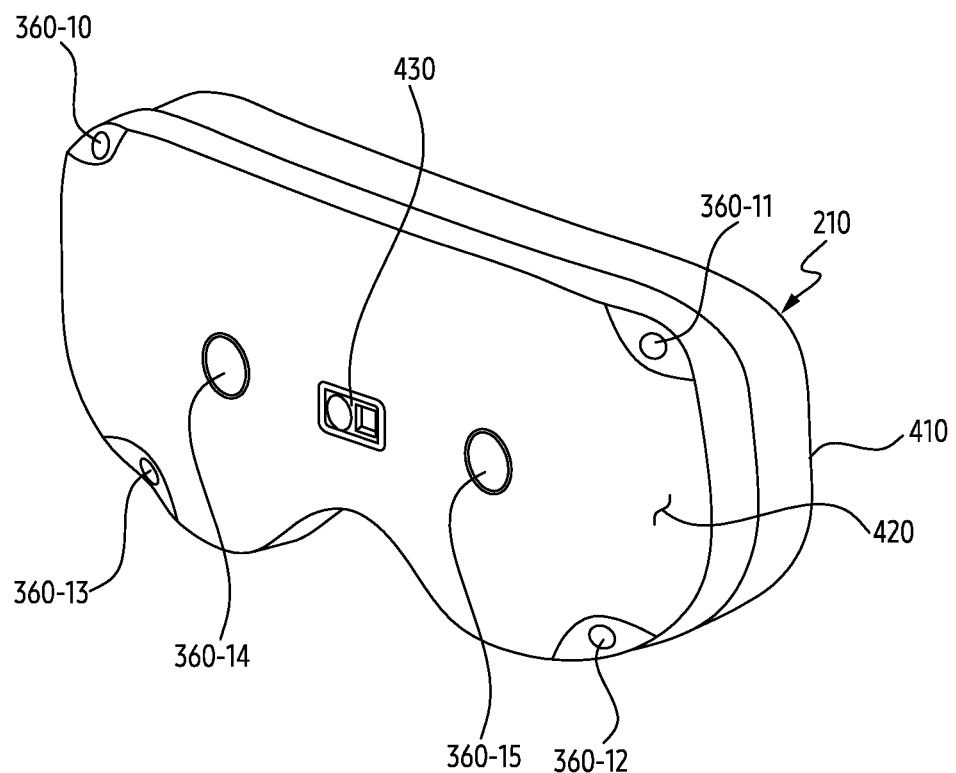

FIGS. 4A and 4B illustrate an example of an appearance of a wearable device 210 according to an embodiment. The wearable device 210 of FIGS. 4A and 4B may be an example of the wearable device 210 of FIG. 2. According to an embodiment, an example of the appearance of the first surface 410 of the housing of the wearable device 210 may be shown in FIG. 4A, and an example of the appearance of the second surface 420 opposite to the first surface 410 may be shown in FIG. 4B. The structure of the wearable device 210 in FIGS. 4A and 4B is exemplary, and the position of each of the hardware and/or circuits included in the wearable device 210 is not limited to the embodiment in FIGS. 4A and 4B.

Referring to FIG. 4A, according to an embodiment, the first surface 410 of the wearable device 210 may have an attachable shape on the user's body part (e.g., the user's face). Although not illustrated, the wearable device 210 may further include a strap and/or one or more temple (e.g., the first temple 304 and/or the second temple 305 of FIGS. 3A and 3B) for being fixed on the user's body part. The first display 350-1 for outputting an image to the left eye of the user's both eyes and a second display 350-2 for outputting an image to the right eye of the user's both eyes may be disposed on the first surface 410. For example, disposing the first display 350-1 and the second display 350-2 on the first surface 410 may include exposing each of the first display 350-1 and the second display 350-2 to at least some outside through an opening formed on the first surface 410. For example, disposing of the first display 350-1 and the second display 350-2 on the first surface 410 may indicate that the first display 350-1 and the second display 350-2 output light along a direction of the first surface 410. For example, disposing the first display 350-1 on the first surface 410 may include adding another circuit and/or structure between the first surface 410 and the first display 350-1. Similarly, disposing the second display 350-2 on the first surface 410 may include adding another circuit and/or structure between the first surface 410 and the second display 350-2. For example, the wearable device 210 may further include rubber or silicon packing formed on the first surface 410 and preventing interference by light (e.g., ambient light) different from the light emitted from the first display 350-1 and the second display 350-2.

According to an embodiment, the wearable devices 210 may include cameras 360-6, and 360-7 for photographing and/or tracking the user's eyes adjacent to each of the first display 350-1 and the second display 350-2. For example, the cameras 360-6 and 360-7 may be referred to as ET cameras. According to an embodiment, the wearable device 210 may include cameras 360-8 and 360-9 for photographing and/or recognizing a user's face. For example, the cameras 360-8 and 360-9 may be referred to as FT cameras.

Referring to FIG. 4B, in an embodiment, cameras (e.g., cameras 360-10, 360-11, 360-12, 360-13, 360-14, and 360-15) and/or sensors (e.g., depth sensors 430) for obtaining information related to the external environment of the wearable device 210 may be disposed on the second surface 420 opposite to the first surface 410 of FIG. 4A. For example, cameras 360-10, 360-11, 360-12, and 360-13 may be disposed on the second surface 420 to recognize external objects (e.g., a hand of the user wearing the wearable device 210) different from the wearable device 210. For example, the wearable device 210 may obtain an image and/or video to be transmitted to each of the user's eyes by using cameras 360-14 and 360-15. For example, the camera 360-14 may be disposed on the second surface 420 of the wearable device 210 to obtain an image to be displayed through the second display 350-2 corresponding to the right eye among the two eyes. For example, the camera 360-15 may be disposed on the second surface 420 of the wearable device 210 to obtain an image to be displayed through the first display 350-1 corresponding to the left eye among the two eyes.

According to an embodiment, the wearable device 210 may include the depth sensor 430 disposed on the second surface 420 to identify a distance between external objects and a wearable device 210. The wearable device 210 may obtain spatial information (e.g., depth map) for at least a part of the FoV (e.g., the FoV 260 of FIG. 2, when the user wears the wearable device 210) of the user wearing the wearable device 210 by using the depth sensor 430.

Although not shown, a microphone for obtaining sound outputted from an external object may be disposed on the second surface 420 of the wearable device 210. The number of microphones may be one or more according to embodiments.

According to an embodiment as described above with reference to FIGS. 3A and 3B and/or FIGS. 4A and 4B, the wearable device 210 connectable to the electronic device 101 may have different structures. For example, as in an embodiment of FIGS. 3A and 3B, the wearable device 210 may output a UI based on augmented reality by combining external light transmitted from the first surface 331 to the second surface 332 with light based on the at least one display 230. Meanwhile, as in an embodiment of FIGS. 4A and 4B, the wearable device 210 may output light toward the eye to output a UI based on virtual reality and/or mixed reality by using at least one display (e.g., the first display 350-1 and/or the second display 350-2), instead of transmitting the external light propagated toward the second surface 420 to the user's eyes. For example, the wearable device 210 may display an image based on the external light propagated toward the second surface 420 obtained by using the plurality of cameras 360-14 and 360-15 on the plurality of displays. Based on the image, the wearable device 210 may provide the user with a user experience such as seeing through the wearable device 210.

According to an embodiment, the wearable device 210 may exchange a signal with the electronic device 101 to obtain a screen to be displayed to a user wearing the wearable device 210. The electronic device 101 may obtain the screen to be displayed through the wearable device 210 based on information related to the user's motion measured by the wearable device 210 and/or the user's gesture received through the electronic device 101. Hereinafter, referring to FIG. 5, according to an embodiment, one or more applications executed by the electronic device 101 to obtain the screen will be described.

Figure 5:
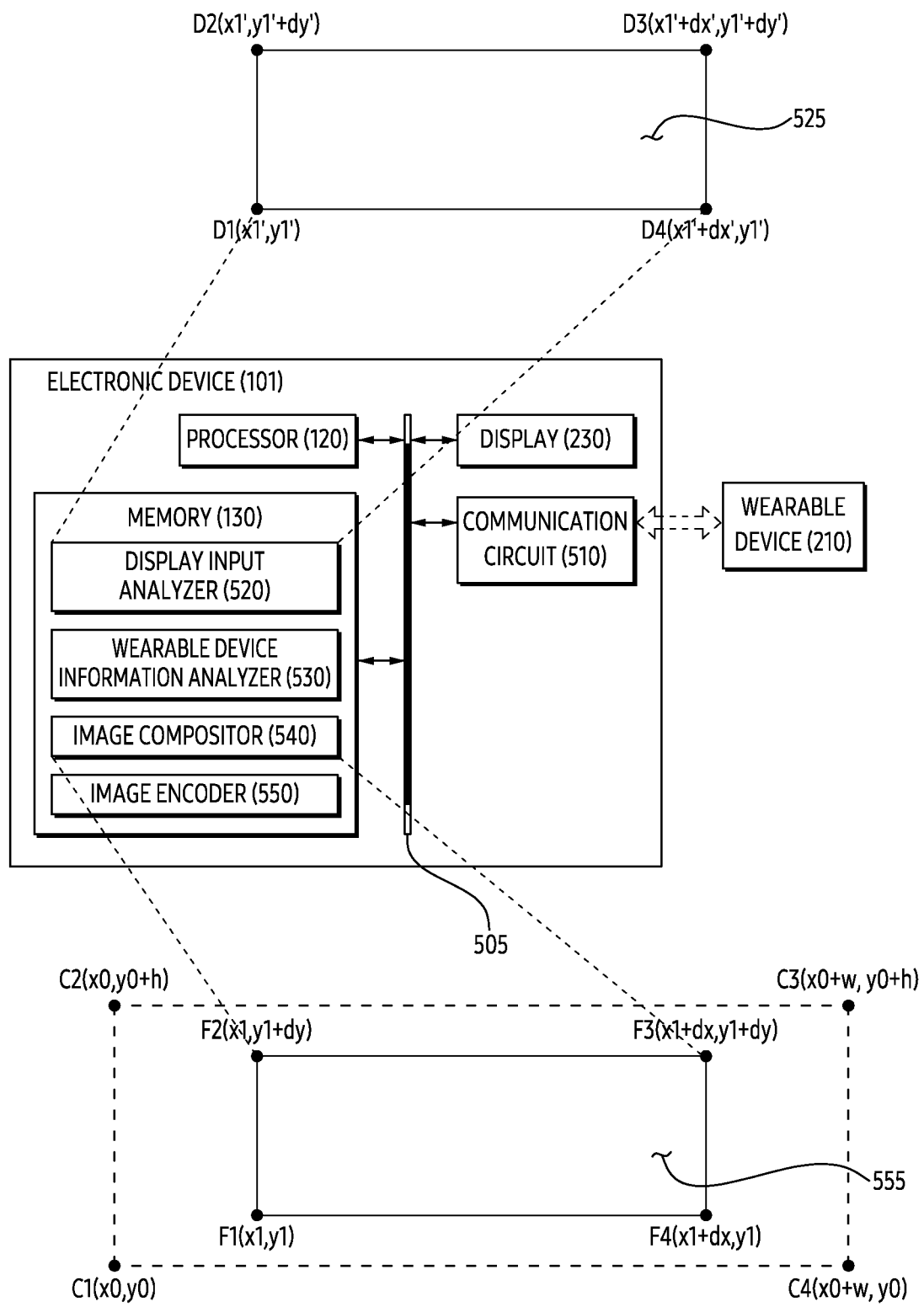
FIG. 5 illustrates an example of an operation in which an electronic device obtains a screen to be displayed through a wearable device, according to an embodiment.

FIG. 5 illustrates an example of an operation in which an electronic device 101 obtains a screen to be displayed through a wearable device 210, according to an embodiment. The electronic device 101 and the wearable device 210 of FIG. 5 may be an example of the electronic device 101 and the wearable device 210 of FIG. 2. FIG. 5 illustrates an example of an electronic device 101 and a wearable device 210 connected to each other based on a network. Referring to FIG. 5, an exemplary situation in which the electronic device 101 and the wearable devices 210 are connected to each other based on a wired network and/or a wireless network is illustrated. For example, the wired network may include a network such as Internet, a local area network (LAN), a wide area network (WAN), Ethernet, or a combination thereof. For example, the wireless network may include a network such as long term evolution (LTE), 5G new radio (NR), wireless fidelity (Wi Fi), Zigbee, near field communication (NFC), Bluetooth, Bluetooth low-energy (BLE) or a combination thereof. Although the electronic device 101 and the wearable device 210 are illustrated as being directly connected, the electronic device 101 and the wearable devices 210 may be indirectly connected through one or more routers and/or access points (APs).

Referring to FIG. 5, according to an embodiment, the electronic device 101 may include at least one of a processor 120, a memory 130, a display 230, or a communication circuit 510. The processor 120, the memory 130, the display 230, and the communication circuit 510 may be electronically and/or operably coupled with each other by an electronical component such as a communication bus 505.

Hereinafter, operably being coupled of hardware components may indicate that a direct or indirect connection between hardware components is established by wire or wirelessly, so that a second hardware component is controlled by a first hardware component among the hardware components. Although illustrated based on different blocks, embodiments are not limited thereto, and a part of the hardware components (e.g., at least a part of the processor 120, the memory 130, and/or the communication circuit 510) illustrated in FIG. 5 may be included in a single integrated circuit, such as a system on a chip (SoC). The type and/or number of the hardware components included in the electronic device 101 is not limited as illustrated in FIG. 5. For example, the electronic device 101 may include only some of the hardware components illustrated in FIG. 5.

According to an embodiment, the processor 120 of the electronic device 101 may include the hardware component for processing data based on one or more instructions. The hardware component for processing data may include, for example, an arithmetic and logic unit (ALU), a floating point unit (FPU), a field programmable gate array (FPGA), and/or a central processing unit (CPU). The number of processors 120 may be one or more. For example, the processor 120 may have a structure of a multi-core processor such as a dual core, a quad core, or a hexa core. The processor 120 of FIG. 5 may include the processor 120 of FIG. 1.

According to an embodiment, the memory 130 of the electronic device 101 may include the hardware component for storing data and/or instructions input and/or output to the processor 120. For example, the memory 130 may include volatile memory such as random-access memory (RAM) and/or non-volatile memory such as read-only memory (ROM). For example, the volatile memory may include at least one of dynamic RAM (DRAM), static RAM (SRAM), Cache RAM (PSRAM), and pseudo RAM (PSRAM). For example, the non-volatile memory may include at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC). The memory 130 of FIG. 3 may include the memory 130 of FIG. 1.

According to an embodiment, in the memory 130 of the electronic device 101, one or more instructions indicating a calculation and/or operation to be performed on data by the processor 120 may be stored. A set of instructions may be referred to as firmware, operating system, process, routine, sub-routine, and/or application. For example, the electronic device 101 and/or the processor 120 may perform at least one of the operations of FIGS. 11, 12, 13, and 14, when a set of a plurality of instructions distributed in the form of an operating system, firmware, driver, and/or application is executed. Hereinafter, the fact that the application is installed in the electronic device 101 indicates that one or more instructions provided in the form of the application are stored in the memory 130 of the electronic device 101, and it may mean that one or more of the applications are stored in an executable format (e.g., a file with a preset extension by the operating system of the electronic device 101) by the processor 120 of the electronic device 101.

According to an embodiment, the display 230 of the electronic device 101 may output visualized information (e.g., at least one of the screens of FIGS. 6B and 6C) to the user. For example, the display 230 may be controlled by the processor 120 (e.g., a graphic processing unit (GPU) included in the processor 120) and may output the visualized information to the user. The display 230 may include a flat panel display (FPD) and/or electronic paper. The FPD may include a liquid crystal display (LCD), a plasma display panel (PDP), and/or one or more light emitting diode (LED). The LED may include an organic light emitting diode (OLED).

According to an embodiment, the display 230 of the electronic device 101 may include a sensor (e.g., a touch sensor panel (TSP)) for detecting an external object (e.g., a user's finger) on the display 230. For example, based on the TSP, the electronic device 101 may detect an external object that contacts the display 230 or floats on the display 230. In response to detecting the external object, the electronic device 101 may execute a function associated with a specific visual object corresponding to the position of the external object on the display 230 among the visual objects displayed in the display 230.

According to an embodiment, the communication circuit 510 of the electronic device 101 may include a hardware component to support transmission and/or reception of electrical signals between the electronic device 101 and the wearable device 210. Although only the wearable device 210 is illustrated as an external electronic device connected to the electronic device 101, the embodiment is not limited thereto, and for example, the electronic device 101 may communicate with the external electronic device 220 of FIG. 2. For example, the communication circuit 510 may include at least one of a MODEM, an antenna, and an O/E (optic/electronic) converter. For example, the communication circuit 510 may support transmission and/or reception of electrical signals based on various types of protocols, such as Ethernet, local area network (LAN), wide area network (WAN), wireless fidelity (Wi Fi), Bluetooth, Bluetooth low energy (BLE), Zigbee, long term evolution (LTE), and 5G new radio (NR).

Referring to FIG. 5, according to an embodiment, a display input analyzer 520, a wearable device information analyzer 530, an image compositor 540, and an image encoder 550 are illustrated as different programs stored in the memory 130 of the electronic device 101. The programs may be an example of program 140 of FIG. 1. Each of the display input analyzer 520, the wearable device information analyzer 530, the image compositor 540, and the image encoder 550 divided into different blocks may correspond to different processes and/or instances executed by the processor 120 of the electronic device 101. The programs in FIG. 5 may be executed by the processor 120 of the electronic device 101 to generate a screen to be displayed to the user through the wearable device 210.

According to an embodiment, the electronic device 101 may identify the wearable device 210 through the communication circuit 510. The electronic device 101 may transmit and/or receive data with the wearable device 210 through the communication circuit 510. For example, based on identifying the wearable device 210, the electronic device 101 may execute the wearable device information analyzer 530 to process information transmitted from the identified wearable device 210. For example, the information transmitted from the wearable device 210 may include data required to generate a screen to be displayed through the wearable device 210. For example, the information may include information indicating a state of the wearable device 210. For example, based on the state of the wearable device 210 identified from the information, the electronic device 101 may determine whether to transmit a screen to the wearable device 210.

According to an embodiment, the electronic device 101 may transmit a screen to the wearable device 210 based on identifying the wearable device 210 in a determined state. The determined state may be identified based on information identified by different sensors of the wearable device 210. The determined state may be identified based on information indicating that the wearable device 210 is worn on a preset body part such as the user's head. For example, based on information indicating a preset input for activation of the wearable device 210, the electronic device 101 may identify the wearable device 210 in the determined state. For example, the electronic device 101 may identify the wearable device 210 in the determined state, based on information received from the wearable device 210 and indicating that the coupling and/or fastening of belts wound around the user's head in the wearable device 210. For example, the electronic device 101 may identify the wearable device 210 in the determined state, based on identifying the user's pupil from an image obtained by the ET camera (e.g., the eye tracking camera 360-1 in FIG. 3A, and/or cameras 360-6 and 360-7 in FIG. 4A) in the wearable device 210. For example, as the wearable device 210 is worn on the user's head, the determined state of the wearable device 210 may include a state of the wearable device 210 capable of displaying a screen to the user.

According to an embodiment, the electronic device 101 may transmit a screen to be displayed in the FoV (e.g., the FoV 260 in FIG. 2) of the user wearing the wearable device 210 to the wearable device 210, based on identifying the wearable device 210 through the communication circuit 510. The electronic device 101 may initiate transmission of the screen based on the execution of the preset mode for transmitting the screen to the wearable device 210. For example, the electronic device 101 may execute the preset mode based on identifying the wearable device 210 in the determined state including the state worn by the user. Based on the execution of the preset mode, the electronic device 101 may execute the preset mode for displaying a screen in the FoV of the wearable device 210 based on the touch input on the displaying area of display 230. For example, the preset mode may include a mode for displaying a screen by using the wearable device 210. For example, based on the execution of the preset mode, the electronic device 101 may refrain from displaying one or more screens in the display 230 based on one or more applications. For example, based on the execution of the preset mode, a screen generated by one or more applications executed by the processor 120 may be transmitted to the wearable device 210 among the display 230 and the wearable device 210.

Referring to FIG. 5, according to an embodiment, the electronic device 101 may obtain an area 240 including a screen to be transmitted to the wearable device 210 based on the execution of the image compositor 540 within a state connected to the wearable device 210. Referring to FIG. 5, an example of a square-shaped area 240 having points C1 to C4 as corners, width w, and height h is illustrated. However, embodiments are not limited thereto. According to an embodiment, based on the execution of the image compositor 540, the electronic device 101 may dispose one or more windows (e.g., the first window 252 and/or the second window 254 of FIG. 2) corresponding to one or more applications executed by the processor 120 of the electronic device 101 in the area 240.

According to an embodiment, based on the execution of the image compositor 540, the electronic device 101 may identify a portion 555 corresponding to the FoV of the wearable device 210 in the area 240 by using a motion of the wearable device 210 identified using the wearable device information analyzer 530. Referring to FIG. 5, a square-shaped portion 555 corresponding to the FoV, having points F1 to F4 as corners, and having a width dx and a height dy is illustrated. For example, coordinate values x1 and y1 of point F1 of the portion 555 may be adjusted by the motion of the wearable device 210. As the coordinate values x1 and y1 are adjusted, the portion 555 corresponding to the FoV 260 may be moved within the area 240.

According to an embodiment, the electronic device 101 may encode the portion 555 of the area 240 selected by the image compositor 540 and corresponding to the FoV, based on the image encoder 550. The electronic device 101 may transmit one or more packets for the encoded portion 555 to the wearable device 210 through the communication circuit 510. The one or more packets may be transmitted from the electronic device 101 to the wearable device 210, based on data structure for streaming the portion 555. The wearable device 210 may decode the portion 555 corresponding to the FoV, based on one or more transmitted packets. The wearable device 210 may display the decoded portion 555 to the user. Since one or more windows corresponding to one or more applications executed by the processor 120 are disposed in the area 240, the portion 555 may include at least a part of the one or more windows.

According to an embodiment, the electronic device 101 may receive a touch input on the displaying area of the display 230 based on the display input analyzer 520. In a state connected to the wearable device 210, the electronic device 101 may form an area 525 for mapping position of a contact point of the touch input to the portion 555 corresponding to the FoV within the area 240, in the displaying area of the display 230. Referring to FIG. 5, each of point D1 to point D4, which are corners of the area 525, may be mapped to point F1 to point F4, which are corners of the portion 555 in the area 240. For example, each of point D1 to point D4, which are the corners of the area 525, may correspond to at least some corners for receiving the touch input within the displaying area of the display 230. In an embodiment, based on the mapping between the area 525 and the portion 555, the electronic device 101 may identify a position in the portion 555 corresponding to the position of the contact point. According to an embodiment, mapping of the position of the contact point of the touch input to the position within the portion 555 based on the area 525 by the electronic device 101 may be performed based on whether a reference position is received from the wearable device 210 based on the execution of the wearable device information analyzer 530.

According to an embodiment, the electronic device 101 may modify a screen displayed in the FoV based on the portion 555 transmitted to the wearable device 210, based on the touch input on the displaying area of the display 230. For example, the electronic device 101 may receive a preset gesture to modify the screen based on the preset function executed by the processor 120 through the displaying area of the display 230. For example, in response to identifying the preset gesture based on the execution of the display input analyzer 520, the electronic device 101 may execute the preset function. For example, the electronic device 101 may modify the screen displayed in the area 240 based on the execution of the preset function. For example, the portion 555 within the area 240 including the modified screen may be transmitted to the wearable device 210 based on the execution of the image compositor 540 and/or the image encoder 550. Since the wearable device 210 displays the portion 555, a user wearing the wearable device 210 may see a screen corresponding to the portion 555 within the modified area 240 by the preset function corresponding to the preset gesture performed on the displaying area of the display 230.

According to an embodiment, the electronic device 101 may display a pointer (e.g., the pointer 270 in FIG. 2) by overlapping in the area 240 including the portion 555 transmitted to the wearable device 210, based on the touch input on the displaying area of the display 230. For example, a position of the pointer in the portion 555 may correspond to a position of a contact point of the touch input identified based on the area 525. According to an embodiment, the electronic device 101 may identify a reference position of the pointer from information received from the wearable device 210 based on the execution of the wearable device information analyzer 530. In response to identifying the reference position, the electronic device 101 may display a pointer based on the reference position, independently of the position of the contact point identified based on the area 525.

As described above, according to an embodiment, the electronic device 101 may display a screen in the user's FoV through the wearable device 210. For example, the electronic device 101 may modify the screen displayed in the FoV based on at least one of the touch input on the displaying area of the display 230 or the information received based on the wearable device 210. Hereinafter, referring to FIGS. 6A, 6B, and 6C, according to an embodiment, an example of an operation of receiving an input related to the screen through the displaying area of the display 230 in a state in which the electronic device 101 is connected to the wearable device 210 will be described.

Figure 6A:
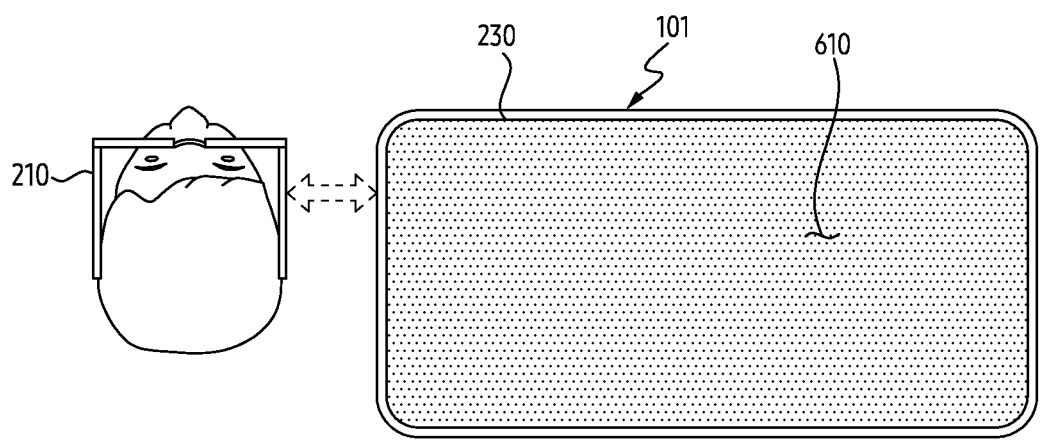
FIGS. 6A, 6B, and 6C illustrate an example of a screen displayed in a displaying area of a display in a state that the electronic device is connected to a wearable device, according to an embodiment.
Figure 6B:
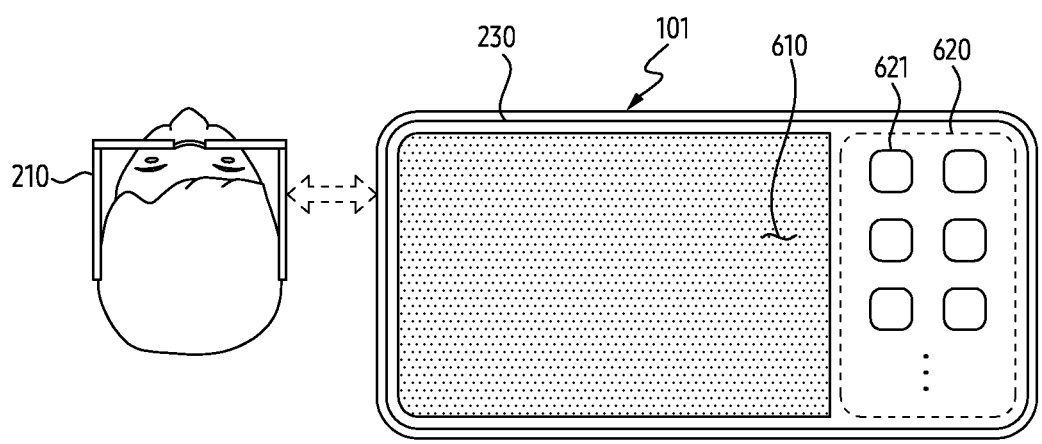
Figure 6C:
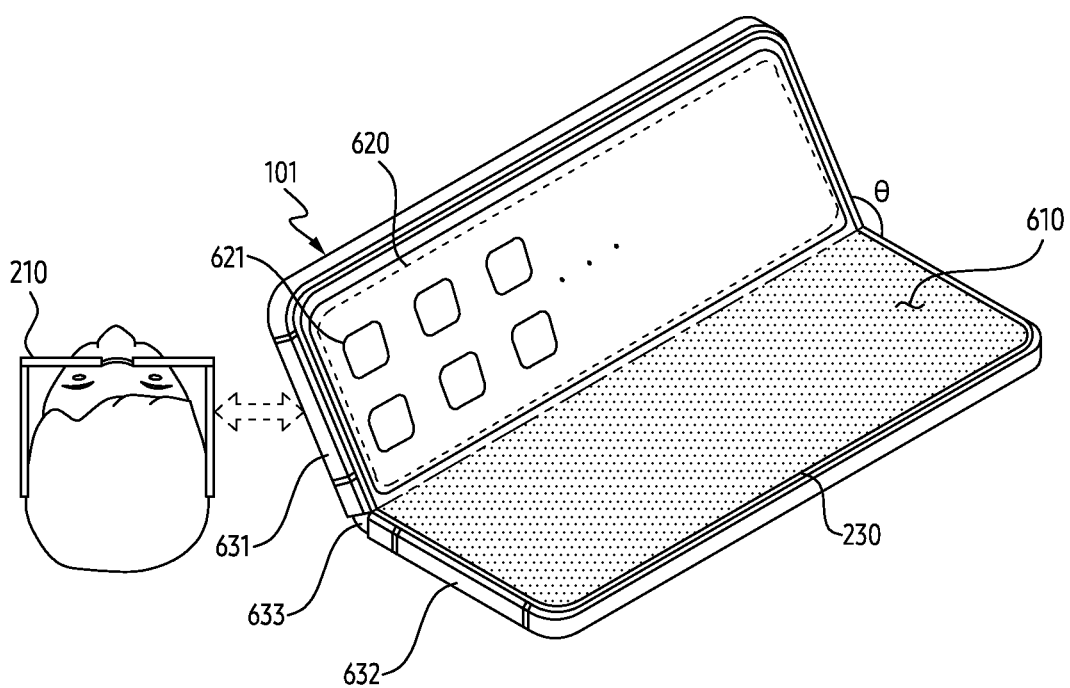

FIGS. 6A, 6B, and 6C illustrate an example of a screen displayed in a displaying area of a display 230 in a state that the electronic device 101 is connected to a wearable device 210, according to an embodiment. The electronic device 101 and wearable device 210 of FIGS. 6A, 6B, and 6C may be examples of the electronic device 101 and wearable device 210 of FIG. 2. For example, the electronic device 101 and the display 230 of FIG. 2 may include the electronic device 101 and the display 230 of FIGS. 6A, 6B, and 6C.

According to an embodiment, the electronic device 101 may be connected to the wearable device 210 by using a communication circuit (e.g., the communication circuit 510 of FIG. 5). Based on identifying the wearable device 210, the electronic device 101 may transmit a screen based on the execution of the processor of the electronic device 101 (e.g., the processor 120 of FIG. 5) to the wearable device 210. For example, the electronic device 101 may transmit a screen provided based on execution of an application to the wearable device 210. According to an embodiment, while transmitting the screen provided based on the execution of the application to the wearable device 210, the electronic device 101 may display a preset screen different from the screen and for receiving an input related to the screen on the display 230.

Referring to FIGS. 6A, 6B, and 6C, according to an embodiment, an example of the preset screen displayed by the electronic device 101 through the display 230 while being connected to wearable device 210 is illustrated. According to an embodiment, as shown in FIGS. 6A, 6B, and 6C, the electronic device 101 may display the preset screen for receiving an input related to the screen displayed through the wearable device 210 in the display 230. The electronic device 101 may display a screen generated based on one or more applications executed by the electronic device 101 in the FoV (e.g., the FoV 260 of FIG. 2) of the wearable device 210, by controlling the wearable device 210, while the preset screen is displayed.

Referring to FIG. 6A, according to an embodiment, the electronic device 101 may display a preset screen including an area 610 corresponding to all of the displaying area of the display 230. The electronic device 101 may receive an input for displaying a pointer in the FoV of the wearable device 210 through the area 610 within the preset screen, such as the area 525 of FIG. 5. For example, the electronic device 101 may deactivate a plurality of pixels corresponding to the area 610, among pixels included in the display 230, based on a preset color (e.g., black). The embodiment is not limited thereto, and the area 610 may have a different color from the preset color. For example, in an embodiment of FIG. 6A in which the area 610 corresponds to all of the displaying area, the electronic device 101 may reduce the power consumed by the display 230 while transmitting a screen to the wearable device 210, by deactivating a plurality of pixels included in the display 230.

Referring to FIG. 6B, according to an embodiment, the electronic device 101 may display a preset screen including the area 610 formed within a part of the displaying area of the display 230. The electronic device 101 may display one or more visual objects for selecting a function and/or an application to be executed based on the FoV of the wearable device 210, within an area 620 different from the area 610 formed in the displaying area of the display 230. In an example of the preset screen of FIG. 6B, the electronic device 101 may receive an input indicating that the size of at least one of the area 610 or the area 620 is adjusted. For example, based on identifying that a border line between the area 610 and the area 620 is dragged, the electronic device 101 may modify the sizes of the area 610 and the area 620, based on the trajectory in which the border line is dragged.

According to an embodiment, the electronic device 101 may include one or more icons 621 representing functions and/or applications to be executed based on the FoV of the wearable device 210 within the area 620 of the display 230. The one or more icons 621 may be added and/or deleted in the area 620 based on an interaction between the electronic device 101 and the user. For example, in response to an input indicating selecting the icon 621 within the area 620, the electronic device 101 may modify the screen displayed in the FoV of the wearable device 210, based on execution of a specific application and/or a specific function corresponding to the icon 621. For example, when the icon 621 is a short cut for a specific application, the electronic device 101 may display a window provided from the specific application in the FoV of the wearable device 210.

Referring to FIG. 6C, an example of the electronic device 101 including a deformable housing 630 is illustrated. According to an embodiment, the housing 630 of the electronic device 101 may include a first sub housing 631, a second sub housing 632, and a hinge assembly 633 rotatably coupled to the first sub housing 631 and the second sub housing 632. For example, the hinge assembly 633 may include a rotation axis for the first sub housing 631 and the second sub housing 632. In an embodiment of FIG. 6C, in which the electronic device 101 includes the deformable housing 630, the electronic device 101 may include a sensor for measuring the shape and/or posture of the housing 630. For example, the sensor may include a hall sensor for measuring the angle $\Theta$ between the first sub housing 631, the hinge assembly 633, and the second sub housing 632. In an embodiment of FIG. 6C, in which the electronic device 101 includes the deformable housing 630, the display 230 of the electronic device 101 may be disposed on one surface of the first sub housing 631 and one surface of the second sub housing 632 across the hinge assembly 633.

According to an embodiment, the electronic device 101 may adjust layout of the preset screen displayed within the display 230 and for receiving input related to the screen displayed in the FoV of the wearable device 210, based on the shape of the housing 630 (e.g., the angle Θ between the first sub housing 631 and the second sub housing 632). Referring to FIG. 6C, based on identifying that the angle Θ between the first sub housing 631, the hinge assembly 633, and the second sub housing 632 is included within a preset range (e.g., range between 80° and 130°) including the right angle, the electronic device 101 may display the preset screen including areas 610 and 620 distinguished by a part of the display 230 disposed on the hinge assembly 633. For example, the areas 610 and 620 of FIG. 6C may correspond to each of the areas 610 and 620 of FIG. 6B.

According to an embodiment, the electronic device 101 may modify arrangement of the areas 610 and 620 displayed in the display 230, based on a direction of gravity acceleration identified in at least one of the first sub housing 631 and the second sub housing 632. For example, when a difference between a direction of gravity acceleration applied to the second sub housing 632 and a direction of the portion of the display 230 disposed on the second sub housing 632 is less than a preset range, the electronic device 101 may display the area 610 on a portion of the display 230 disposed on the second sub housing 632, and may display the area 620 on another portion of the display 230 disposed on the first sub housing 631.

According to an embodiment, in a state of FIGS. 6A, 6B, and 6C in which a preset screen is displayed in the display 230, the electronic device 101 may control the screen displayed in the FoV of the wearable device 210 based on an input received through the preset screen. For example, based on a touch input on at least a part of the displaying area of the display 230 on which the area 610 is displayed, the electronic device 101 may display a pointer in the FoV of the wearable device 210. For example, the touch input related to the area 610 may be processed by the display input analyzer 520 of FIG. 5, which is executed by the processor of the electronic device 101. On the other hand, based on a touch input on a part of the displaying area of the display 230 on which the area 620 is displayed, the electronic device 101 may display a screen corresponding to a visual object (e.g., the icon 621) selected by the touch input in the FoV of the wearable device 210. The touch input related to the area 620 may be processed independently of the display input analyzer 520, which is executed by the processor of the electronic device 101.

As described above, according to an embodiment, the electronic device 101 may receive an input related to a screen displayed in the FoV of the wearable device 210 through the displaying area of the display 230, based on identifying the wearable device 210. For example, since the preset screen is displayed, displaying one or more screens provided from one or more applications executed by the electronic device 101 within the displaying area of the display 230 may be ceased. The one or more screens may be transmitted to the wearable device 210 among the display 230 and the wearable device 210. For example, the electronic device 101 may reduce power consumption by the display 230, in a state of identifying the wearable device 210 based on the preset screen including the area 610 for deactivating the plurality of pixels in the display 230. For example, in the state of displaying the preset screen, the electronic device 101 may adjust a frame rate of the display 230 to be less than a preset frame rate. Based on the adjustment of the frame rate, the electronic device 101 may reduce power consumption by the display 230.

Hereinafter, referring to FIGS. 7A and 7B, according to an embodiment, an example of an operation in which the electronic device 101 stores a gesture for displaying a specific screen in the FoV of the wearable device 210 in a state in which the electronic device 101 and the wearable device 210 are connected to each other will be described.

Figure 7A:
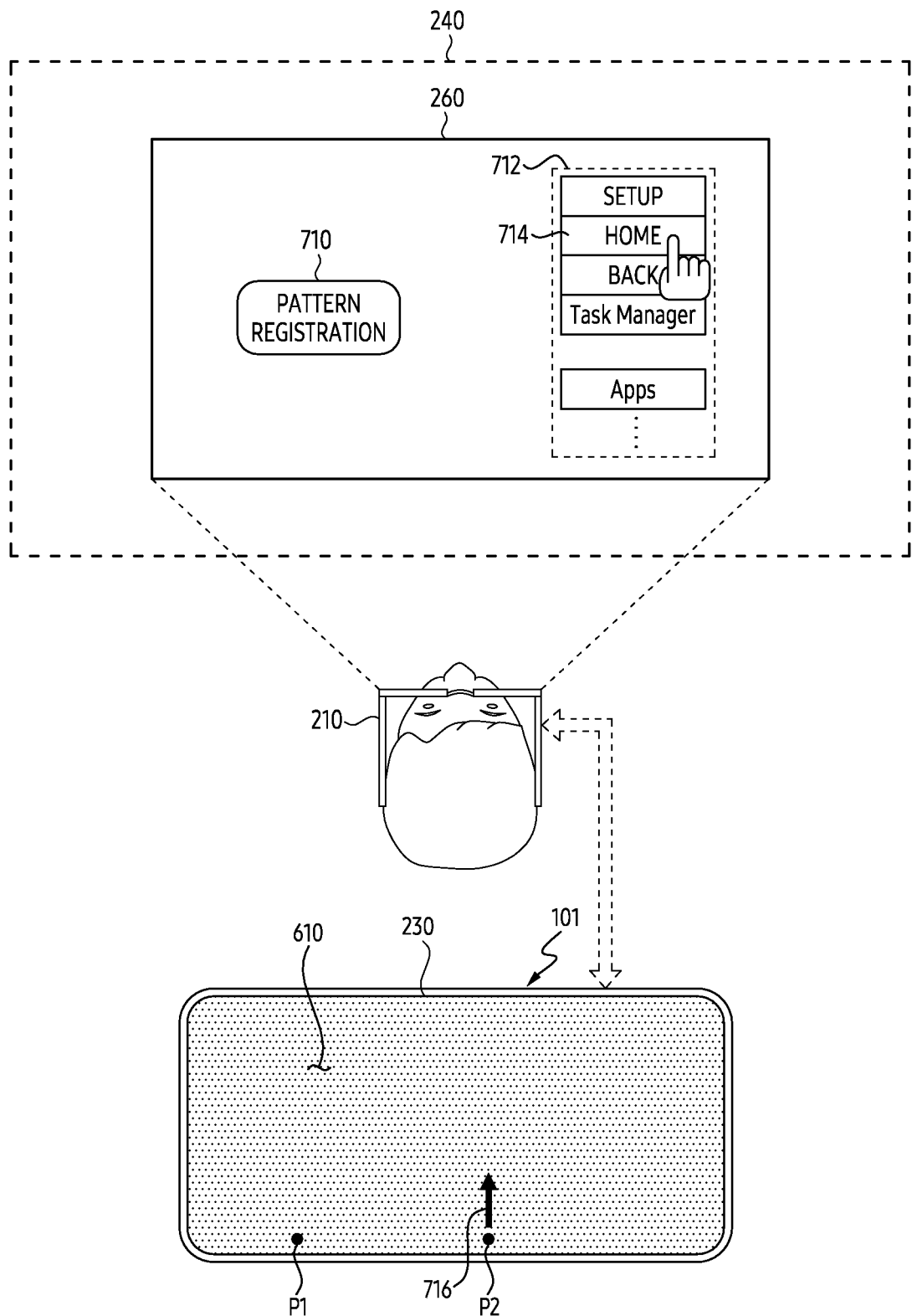
FIGS. 7A and 7B illustrate an example of an operation in which an electronic device modifies a screen displayed in a FoV of a wearable device based on a touch input on a displaying area of a display, according to an embodiment.
Figure 7B:
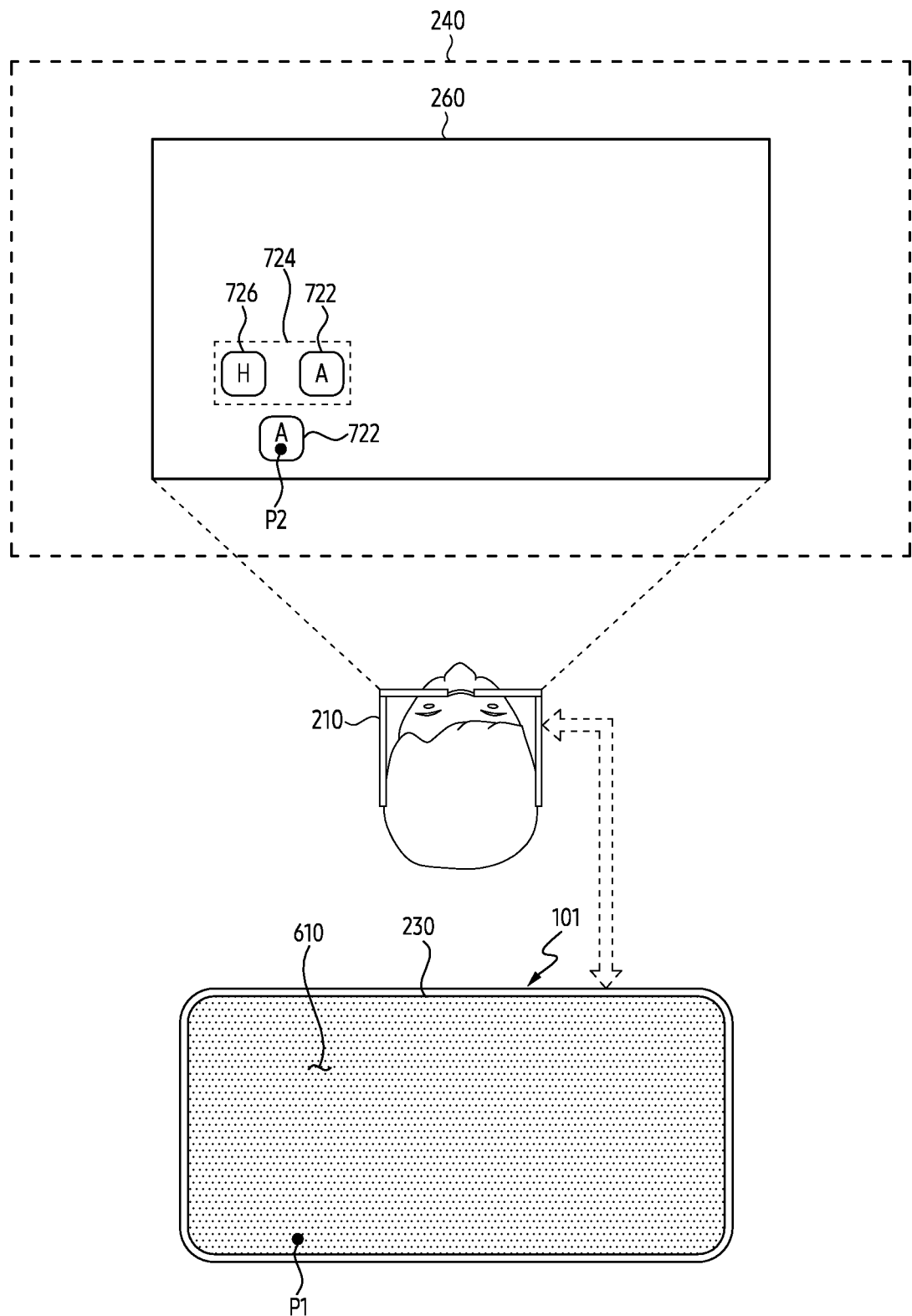

FIGS. 7A and 7B illustrate an example of an operation in which an electronic device 101 modifies a screen displayed in a FoV 260 of a wearable device 210 based on a touch input on a displaying area of a display 230, according to an embodiment. The electronic device 101 and the wearable device 210 of FIGS. 7A and 7B may be an example of the electronic device 101 and the wearable device 210 of FIG. 2. For example, the electronic device 101 and the display 230 of FIG. 2 may include the electronic device 101 of FIG. 7B and the display 230 of FIG. 7A.

Referring to FIGS. 7A and 7B, an exemplary state of the electronic device 101 connected to the wearable device 210 is illustrated. The electronic device 101 may receive an input related to the screen displayed in the FoV 260 of the wearable device 210 by using the display 230 in the electronic device 101. For example, the electronic device 101 may receive an input for controlling the wearable device 210 through the display 230. Referring to FIG. 7A, an example in which the electronic device 101 displays a preset screen including the area 610 corresponding to the entire displaying area of the display 230, similar to FIG. 6A, is illustrated. The embodiment is not limited thereto, and the electronic device 101 may display the preset screen illustrated in FIGS. 6B and 6C on the display 230.

Referring to FIG. 7A, according to an embodiment, the electronic device 101 may display a visual object 710 for matching a gesture performed on the displaying area of the display 230 and a function supported by the electronic device 101, by controlling the wearable device 210, within the FoV 260. Referring to FIG. 7A, an example in which the electronic device 101 displays the visual object 710 having a shape of a button including preset text (e.g., "pattern registration") is illustrated. The shape of the visual object 710 is not limited to an embodiment of FIG. 7A. Referring to FIG. 7A, based on an input indicating that the visual object 710 is selected, the electronic device 101 may control the wearable device 210 to display a list of functions supported by the electronic device 101 within a portion 712 of the FoV 260. The input may be identified by the electronic device 101 based on an operation described later with reference to FIGS. 8A, 8B, 8C, 9, 10A, 10B, and 10C.

Referring to FIG. 7A, according to an embodiment, an example of a list of functions supported by the electronic device 101 that the electronic device 101 displays in the portion 712 of the FoV 260 based on the screen transmitted to the wearable device 210 is illustrated. For example, the list may include system applications provided by the operating system of the electronic device 101, such as a setup application, a home application (or launcher application) for displaying a home screen, and/or a task manager application for displaying a list of one or more applications executed by the electronic device 101. For example, the list may include one or more applications installed in the electronic device 101, or one or more functions executable in the electronic device 101 and/or the wearable device 210. For example, the list may include a preset function for switching the screens based on a stack of screens displayed by applications executed by the electronic device 101. Referring to FIG. 7A, it is assumed that the electronic device 101 receives an input indicating that a visual object 714 related to the execution of the home application is selected in the list displayed within the portion 712 of the FoV 260. For example, the input may be received through a touch input on the display 230 of the electronic device 101 or through a user's motion identified by the wearable device 210. For example, the input may be identified by the electronic device 101 based on an operation described later with reference to FIGS. 8A, 8B, 8C, 9, 10A, 10B, and 10C.

For example, based on the input indicating that the visual object 714 is selected, the electronic device 101 may enter a preset mode for registering a gesture to execute a function corresponding to the visual object 714 (a function to execute a home application in the above assumption). Within the preset mode, the electronic device 101 may register a gesture performed on the displaying area of the display 230 as a gesture for executing the function. Registering the gesture in the preset mode by the electronic device 101 may be performed based on the execution of the display input analyzer 520 of FIG. 5.

Referring to FIG. 7A, the electronic device 101 may obtain a gesture for executing the function based on the area 610 formed in the displaying area. For example, when receiving a gesture of double tapping the point P1 in the left bottom of the area 610, the electronic device 101 may match the gesture of double tapping the point P1 to a function executing the home application. For example, when receiving a swipe gesture dragged along a direction 716 from the point P2 in the area 610, the electronic device 101 may register the swipe gesture as a function executing the home application. Receiving a gesture for executing the function by the electronic device 101 is not limited to the area 610 formed within the displaying area of the display 230. For example, based on the number and/or duration of a button (e.g., a power button, and/or volume button) exposed to the outside through a part of the housing of the electronic device 101 is pressed, the electronic device 101 may obtain a gesture related to the button in the preset mode for registering a gesture for executing the function. Hereinafter, it is assumed that the electronic device 101 has registered a double tap gesture for the point P1 as a gesture for executing a function corresponding to the visual object 714.

According to an embodiment, based on the above-described operation with reference to FIG. 7A, after registering a gesture for executing a specific function supported by the electronic device 101, the electronic device 101 may execute the specific function based on the identification of the registered gesture. For example, the electronic device 101 may display a screen based on the execution of the specific function within the FoV 260 of the wearable device 210. Referring to FIG. 7B, an exemplary state of the electronic device 101 and the wearable device 210 after registering the double tap gesture on the above assumption as a gesture for the execution of the home application is shown.

In a state of FIG. 7B, the electronic device 101 may modify the screen in the FoV 260 of the wearable device 210 based on a touch input on the displaying area of the display 230. For example, the electronic device 101 may receive a double tap gesture for the point P1 within the area 610 formed in the displaying area of the display 230. Based on the above assumption that the function for executing the home application is matched with the double tap gesture for the point P1, the electronic device 101 may execute the home application. The electronic device 101 may display the screen (e.g., the home screen) provided from the executed home application in the FoV 260 of the wearable device 210. For example, when different functions are assigned to a plurality of gestures including the double tap gesture for point P1, the electronic device 101 may compare a gesture based on the touch input on the area 610 with the plurality of gestures. When the gesture received through the area 610 matches any one of the plurality of gestures, the electronic device 101 may execute a function corresponding to the matched gesture and display a screen corresponding to the executed function in the FoV 260 of the wearable device 210. The screen may be transmitted from the electronic device 101 to the wearable device 210, based on the execution of the image compositor 540 and/or the image encoder 550 of FIG. 5. In an embodiment, when the gesture received through the area 610 does not match the plurality of gestures, the electronic device 101 may display a pointer in the FoV 260 of the wearable device 210, based on the gesture. The operation of displaying the pointer by the electronic device 101 will be described with reference to FIGS. 8A, 8B, and 8C.

As described above with reference to FIG. 5, the area 610 formed in the displaying area of the display 230 of the electronic device 101 may be mapped to the FoV 260 of the wearable device 210. Within the exemplary state of FIG. 7B receiving a double tap gesture for point P1 in the area 610, the electronic device 101 may control the wearable device 210 to display the visual object 722 within the point P2 of the FoV 260 corresponding to the point P1. According to an embodiment, when the gesture received through the area 610 of the display 230 is matched with a gesture registered to execute a specific function and related to the visual object 722 displayed in the FoV 260, the electronic device 101 may display a visual guide for selecting any one of another function related to the visual object 722 or the specific function.

For example, the double tap gesture for point P1 within the area 610 may be mapped as the double tap gesture for point P2 in the FoV 260. Based on identifying the visual object 722 displayed on the point P2 of the FoV 260 to which the double tap gesture is mapped, while the double tap gesture is registered by the user and matches the gesture for executing the home application, the electronic device 101 may display a menu 724 for selecting any one of a first function assigned to the double tap gesture and a second function assigned to the visual object 722 as depicted in FIG. 7B. The menu 724 may be displayed in the FoV 260 of the wearable device 210. For example, the electronic device 101 may control the wearable device 210 to display the menu 724 on a part of the FoV 260 in which the visual object 722 is displayed.

Referring to FIG. 7B, according to an embodiment, the electronic device 101 may display a visual object 726 to execute the function assigned to the visual object 722 displayed on the point P2 of the FoV 260 and assigned to the double tap gesture received through area 610, in the menu 724. Based on an input indicating any one of the visual objects 722 and 726 in the menu 724, the electronic device 101 may execute a function corresponding to one visual object selected by the input. For example, the input may be received through a touch input on the display 230 of the electronic device 101 or through a user's motion identified by the wearable device 210. For example, the input may be identified by the electronic device 101 based on an operation described later with reference to FIGS. 8A, 8B, 8C, 9, 10A, 10B, and 10C. Based on the executed function, the electronic device 101 may modify a screen displayed in the FoV 260 of the wearable device 210. For example, in response to an input indicating that the visual object 722 is selected, the electronic device 101 may transmit a preset screen based on the function assigned to the visual object 722 to the wearable device 210. For example, in response to another input indicating that the visual object 726 is selected, the electronic device 101 may transmit a screen (e.g., a home screen provided by a home application) corresponding to the function registered in the double tap gesture for the visual object 726 and/or point P1 to the wearable device 210. The wearable device 210 may modify the screen displayed in the FoV 260 based on the screen transmitted from the electronic device 101.

As described above, according to an embodiment, the electronic device 101 may receive an input for modifying a screen to be displayed in the FoV 260 of the wearable device 210 in a state connected with the wearable device 210. The input may be received through the area 610 formed in the displaying area of the display 230 in the electronic device 101. According to an embodiment, the electronic device 101 may match a pattern of the gesture performed on the area 610 with a specific screen to be displayed through the FoV 260. The electronic device 101 detecting the gesture having the pattern may transmit a specific screen matched to the pattern to the wearable device 210. The wearable device 210 may display the specific screen in the FoV 260. For example, the electronic device 101 may support the direct execution of the specific screen to be displayed in the FoV 260 of the wearable device 210 based on the specific gesture received through the area 610 within the displaying area of the display 230.

According to an embodiment, the electronic device 101 may display a pointer corresponding to the touch input received through the area 610 in the FoV 260, based on the relationship between the area 610 within the displaying area of the display 230 and the FoV 260 of the wearable device 210. Hereinafter, referring to FIGS. 8A to 8C, according to an embodiment, an example of an operation in which the electronic device 101 displays a pointer in the FoV 260 of the wearable device 210 will be described.

Figure 8A:
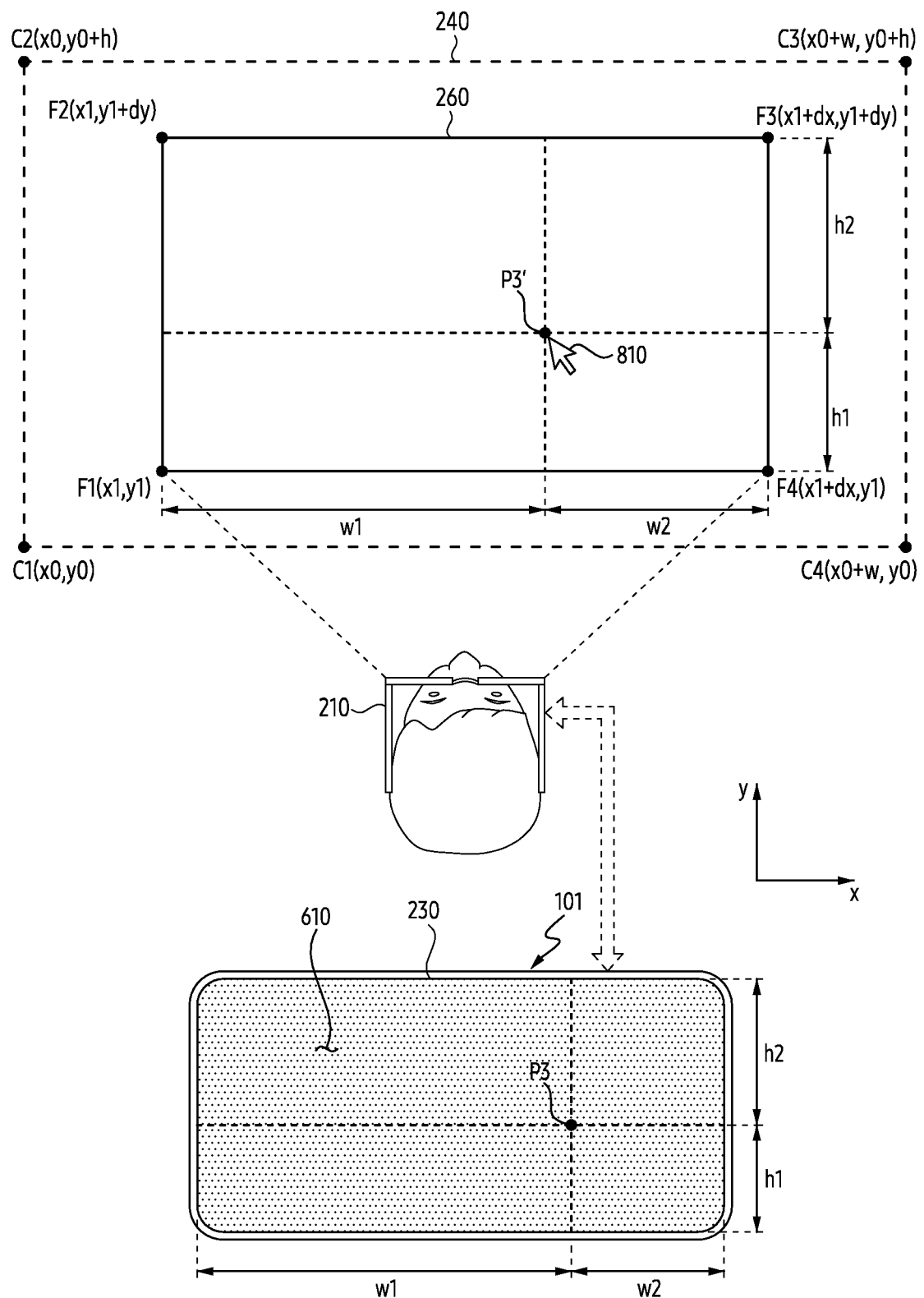
FIGS. 8A, 8B, and 8C illustrate an example of an operation in which an electronic device displays a pointer in a FoV of a wearable device according to an embodiment.
Figure 8B:
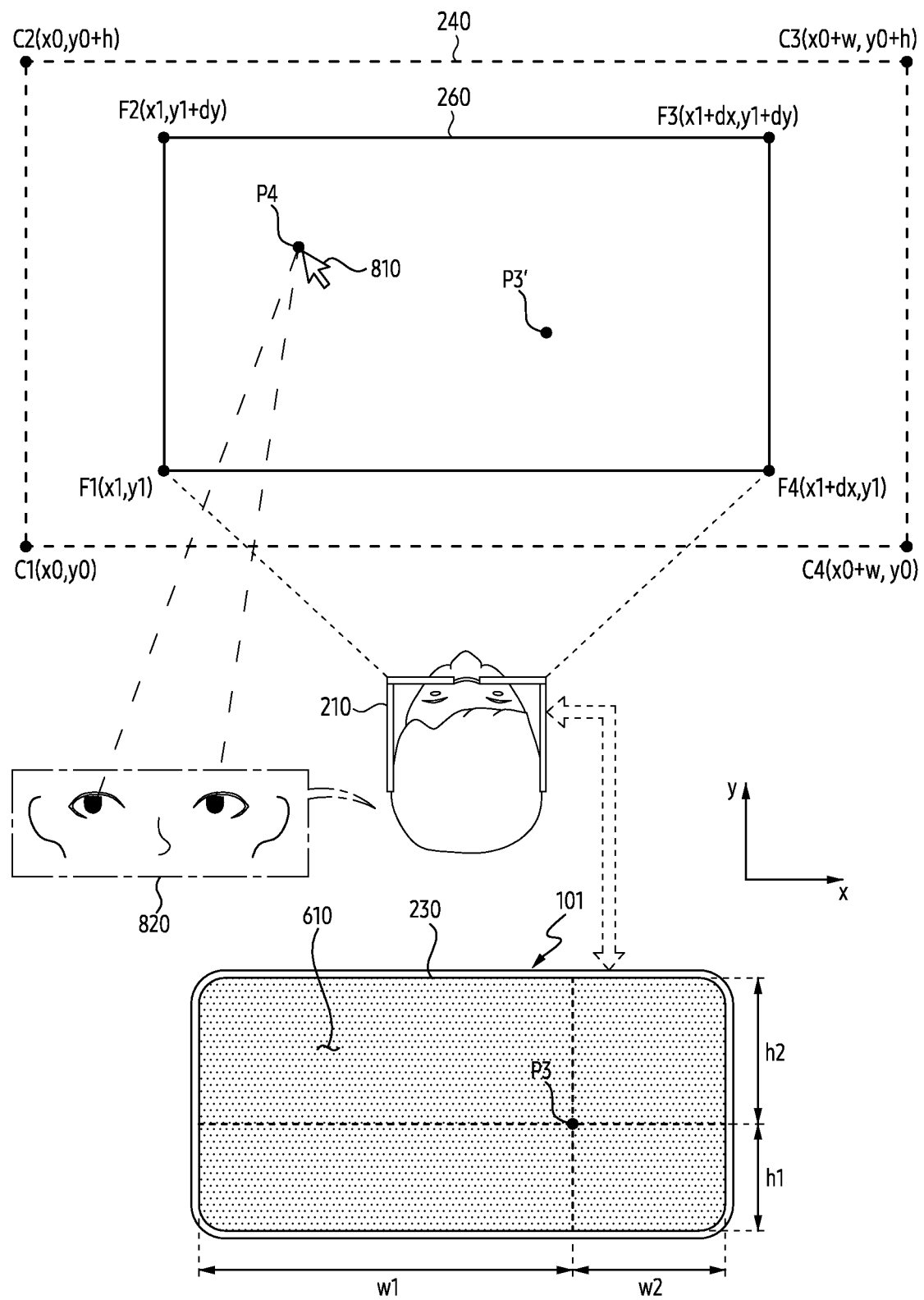
Figure 8C:
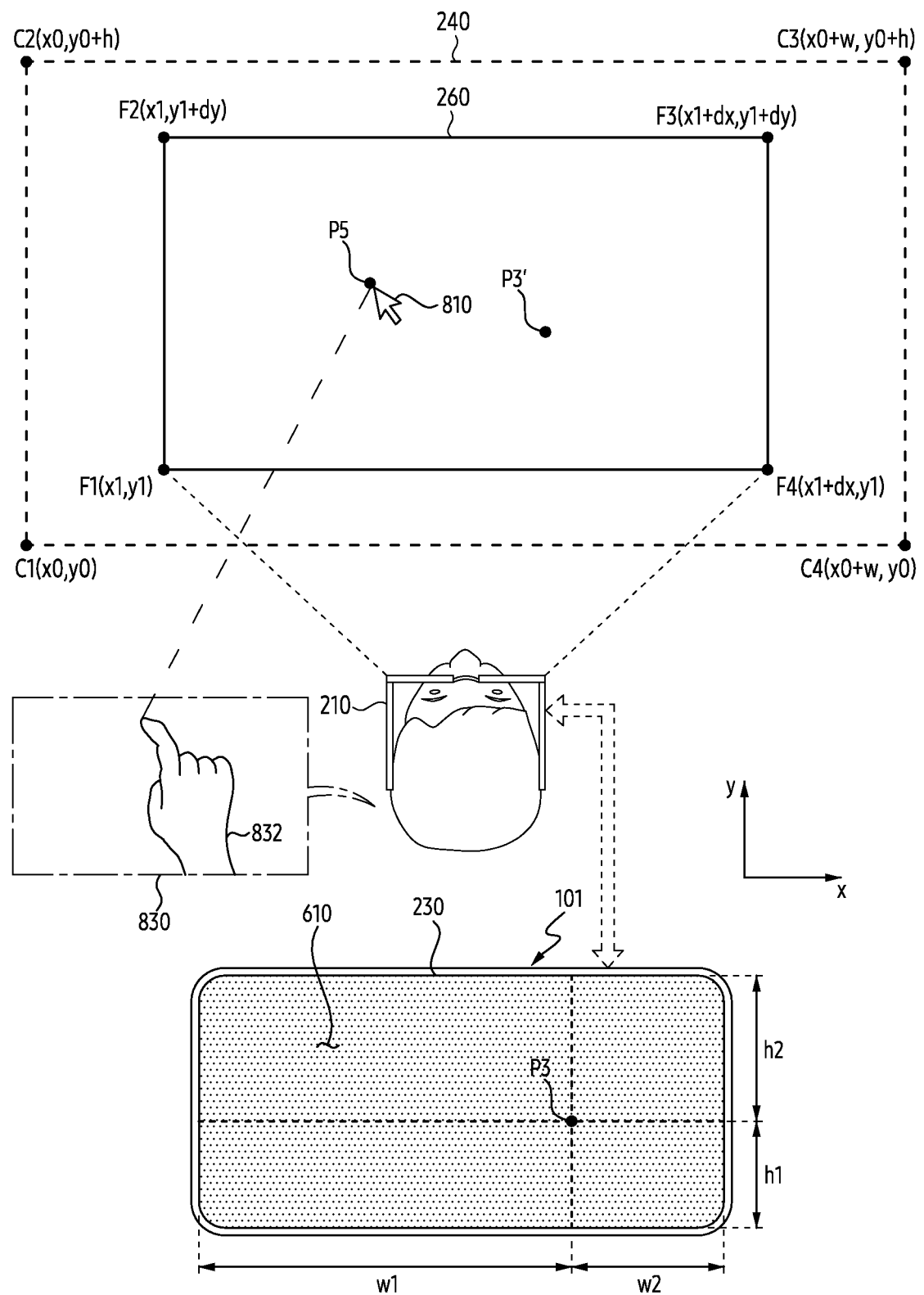

FIGS. 8A, 8B, and 8C illustrate an example of an operation in which an electronic device 101 displays a pointer in a FoV 260 of a wearable device 210, according to an embodiment. The electronic device 101 and wearable device 210 of FIGS. 8A, 8B, and 8C may be an example of the electronic device 101 and wearable device 210 of FIG. 2. For example, the electronic device 101 and the display 230 of FIG. 2 may include the electronic device 101 and the display 230 of FIGS. 8A, 8B, and 8C.

Referring to FIGS. 8A, 8B, and 8C, according to an embodiment, an exemplary state after the electronic device 101 identifies the wearable device 210 is illustrated. Based on identifying the wearable device 210, the electronic device 101 may transmit a screen provided from an application executed by the electronic device 101 to the wearable device 210 among the display 230 and the wearable device 210. For example, identifying the wearable device 210 by the electronic device 101 may include establishing a direct communication link between the electronic device 101 and the wearable device 210 based on a wireless communication protocol such as Wi-Fi Direct. For example, within a state of transmitting the screen to the wearable device 210, the electronic device 101 may display a preset screen for controlling the screen transmitted to the wearable device 210 in the display 230. For example, the preset screen may include a preset screen including areas 610 and 620 of FIGS. 6A, 6B, and 6C.

Referring to FIGS. 8A, 8B, and 8C, according to an embodiment, based on a touch input on the displaying area of the display 230, the electronic device 101 may display or move a pointer 810 within the FoV 260 of the wearable device 210 based on the touch input. Based on the reception of the touch input different from the gesture registered from the user, described above with reference to FIGS. 7A and 7B, the electronic device 101 may add the pointer 810 to the screen transmitted to the wearable device 210. The position in the screen to which the pointer 810 is added may be determined based on a relationship between a coordinate system of the area 610 and a coordinate system of the FoV 260. The position in the screen to which the pointer 810 is added may be related to information transmitted from the wearable device 210 to the electronic device 101. For example, the information may include at least one of a motion (e.g., the motion of the wearable device 210 generated by the user wearing the wearable device 210) of the wearable device 210, an image including the pupil of the user wearing the wearable device 210, or a motion of the preset body part (e.g., hand) included in the external space of the wearable device 210.

According to an embodiment, information received from the wearable device 210 by the electronic device 101 may be related to a reference position for adding the pointer 810 in the FoV 260 of the wearable device 210. For example, the electronic device 101 may identify a position within the FoV 260 at which the user gazes, based on an image included in the information and including the pupil of the user wearing the wearable device 210. The electronic device 101 may determine the position within the FoV 260 gazed by the user and identified based on the image as the reference position. In an embodiment, when a visual object within the FoV 260 selected by the user before receiving the touch input on the area 610 of the display 230 exists, the electronic device 101 may determine a position of the visual object with in the FoV 260 as the reference position. An operation in which the electronic device 101 identifies the reference position of the pointer 810 from the image including the user's pupil will be described with reference to FIG. 8B. In an embodiment, the electronic device 101 may identify a preset body part (e.g., user's hand) included in the external space, based on an image included in the information and including the external space of the wearable device 210. The electronic device 101 may identify the reference position of the pointer 810 based on the position of the preset body part in the external space. An operation in which the electronic device 101 identifies the reference position based on the position of the preset body part identified through the image will be described with reference to FIG. 8C.

Referring to FIG. 8A, an exemplary case in which the electronic device 101 receives a touch input on point P3 within the area 610 formed in the displaying area of the display 230, in a state in which the reference position related to the pointer 810 was not identified from the information received from the wearable device 210 is illustrated. In an exemplary case illustrated in FIG. 8A, the electronic device 101 may identify a position (e.g., point P3') of the pointer 810 within the FoV 260 of the wearable device 210, based on a position (e.g., point P3) of the contact point of the touch input on the area 610. For example, based on a relationship between a first surface in the displaying area of the display 230 including the area 610 and a second surface shown through the FoV 260, the electronic device 101 may identify the position of the pointer 810 on the second surface corresponding to the position of the contact point of the touch input on the first surface. The electronic device 101 may obtain a second plane coordinate indicating the position of the 810 in the second surface, based on a first plane coordinate indicating the position of the contact point of the touch input based on the first surface. For example, the electronic device 101 may identify the point P3' in the FoV 260 corresponding to the point P3 in the area 610 by modifying the coordinate values of point P3, which is the position of the contact point, in the area 610 according to the proportional mapping between the area 610 and the FoV 260.

Referring to FIG. 8A, according to an embodiment, the electronic device 101 may display the pointer 810 on the point P3' of the FoV 260 based on the touch input performed on the point P3 in the area 610. Referring to FIG. 8A, it is assumed that the area 610 is divided into a ratio of w1:w2 along the x-axis direction and divided into a ratio of h1:h2 along the y-axis direction, with respect to the point P3. According to an embodiment, the electronic device 101 may identify the point P3' in the FoV 260 corresponding to the point P3 in the area 610 based on the mapping between the area 610 and the FoV 260. Referring to FIG. 8A, the point P3' identified based on the mapping may divide the FoV 260 at a ratio of w1:w2 along the x-axis direction and at a ratio of h1:h2 along the direction of the y-axis.

As described above, according to an embodiment, in a state in which the gaze and/or motion of the user wearing the wearable device 210 is not identified from the information received from the wearable device 210, the electronic device 101 may process a touch input on the displaying area based on the mapping between the displaying area of the display 230 and the FoV 260. For example, the electronic device 101 may obtain the coordinate values of the second position in the FoV 260 based on the coordinate values of the first position of the contact point on the displaying area. The electronic device 101 may display the pointer 810 on the second position in the FoV 260 of the wearable device 210 based on information transmitted to the wearable device 210. In an example of FIG. 8A, a coordinate system within the FoV 260 of the wearable device 210 may be proportionally matched within the area 610 formed within the displaying area of the display 230.

According to an embodiment, when the point (e.g., the user's gaze measured by wearable device 210 and/or the point selected by the user's finger) within the FoV 260 focused by the user exists, the electronic device 101 may display the pointer 810 in the point independently of the position of the touch input on the displaying area of the display 230. For example, since the priority of the point within the FoV 260 focused by the user is higher than the position of the touch input, the electronic device 101 may display the pointer 810 in the point within the FoV 260, independently of the position within the FoV 260 corresponding to the position of the touch input. The electronic device 101 may identify the point within the FoV 260 focused by the user, based on the information received from the wearable device 210.

Referring to FIG. 8B, according to an embodiment, an example in which the electronic device 101 receives an image 820 including a pupil from the wearable device 210 is illustrated. The image 820 may be obtained based on at least one camera in the wearable device 210 (e.g., eye tracking camera 360-1 in FIG. 3A, and/or cameras 360-6, 360-7 in FIG. 4A). The at least one camera may be disposed toward the user's pupil while the user wears the wearable device 210. The image 820 may be transmitted from the wearable device 210 to the electronic device 101 in a state in which the electronic device 101 and the wearable device 210 are connected. The electronic device 101 may identify a direction of the gaze of the user wearing the wearable device 210 based on the position of the pupil in the image 820. In an exemplary case of FIG. 8B, it is assumed that the electronic device 101 identifies a direction of the user's gaze looking at the point P4 in the FoV 260 of the wearable device 210 based on the image 820. The electronic device 101 may identify the reference position for the pointer 810 based on the direction of the gaze identified based on the image 820 received from the wearable device 210.

Based on the assumption, the electronic device 101 may receive a touch input on the displaying area of the display 230 while the point P4 in the FoV 260 is focused by the user. Referring to FIG. 8B, the electronic device 101 may receive a touch input on the point P3 in the area 610 of the displaying area. The electronic device 101 receiving the touch input may display the pointer 810 on the point P4 among the point P3' in the FoV 260 corresponding to the point P3 and the point P4 in the FoV 260 focused by the user. For example, based on a gesture dragged from the point P3, the electronic device 101 may adjust the image transmitted to the wearable device 210 to move the pointer 810 displayed on the point P4 of the FoV 260 based on the trajectory of the gesture. The point P4 in the FoV 260 focused by the user may be set as a reference position for displaying the pointer 810.

According to an embodiment, the electronic device 101 may request the wearable device 210 to cease transmission of the image 820 based on the wearable device 210, while receiving the image 820 including the pupil from the wearable device 210, based on the touch input on the displaying area of display 230. As described above with reference to FIG. 8B, in a state in which the pointer 810 is displayed within the FoV 260 based on the touch input, the user may gaze at the pointer 810. Based on the typical situation in which the user gazes at the pointer 810 within the FoV 260, the electronic device 101 may transmit a signal for ceasing to transmit the image 820 including the pupil to the wearable device 210 while displaying the pointer 810 in the FoV 260 based on the touch input. For example, the electronic device 101 may transmit the signal by using a communication link established to stream a screen to the wearable device 210. The signal may include an event packet transmitted to the wearable device 210 through the communication link. The signal may include a packet transmitted to the wearable device 210 through the communication link and including a preset flag and/or a preset parameter for ceasing the transmission of the image 820. The preset parameter may be included in a preset field (e.g., a preset field for ceasing the transmission of the image 820) of the packet. The packet may be temporarily stored in a buffer formed in a memory (e.g., the memory 130 of FIG. 5) of the electronic device 101. The electronic device 101 may generate the event packet to be transmitted to the wearable device 210 when no packet exists in the buffer. When at least one packet is stored in the buffer, the electronic device 101 may add the preset parameter in the at least one packet stored in the buffer. The embodiment is not limited thereto, and the electronic device 101 may transmit the signal for ceasing the transmission of the image 820 independently of the communication link.

According to an embodiment, the wearable device 210 connected to the electronic device 101 may at least temporarily cease to obtain the image 820 including the pupil, based on a request to cease transmitting the image 820 from the electronic device 101. For example, the wearable device 210 may cease to obtain the image 820 by deactivating at least one camera disposed toward the pupil. Since the wearable device 210 deactivates at least one camera or ceases transmitting a signal including the image 820, power consumed by the wearable device 210 may be reduced.

While the wearable device 210 ceases to obtain and/or transmit the image 820 based on the request, network resources between the wearable device 210 and the electronic device 101 may be reduced. Since the image 820 is used to identify the reference position, the transmission of information indicating the reference position may be ceased based on the request of the electronic device 101.

Referring to FIG. 8C, according to an embodiment, an exemplary case in which the electronic device 101 receives an image 830 including at least a part of an external space from the wearable device 210 is shown. The image 830 may be obtained based on at least one camera (e.g., the gesture recognition camera 360-2 in FIG. 3B, and/or the cameras 360-10, 360-11, 360-12, 360-13 in FIG. 4B) in the wearable device 210. For example, the at least one camera may be disposed toward a preset direction (e.g., the front of the user) in a state in which the user wears the wearable device 210. The electronic device 101 may identify a subject (e.g., the hand 832) included in the image 830. Referring to FIG. 8C, based on identifying the hand 832 included in the image 830 received from the wearable device 210, the electronic device 101 may identify a position of the hand 832 in the image 830 and/or posture of the hand 832. The position of the hand 832 in the image 830 may be set as a reference position for displaying the pointer 810 in the FoV 260. For example, the electronic device 101 may determine point P5 in the FoV 260 corresponding to the hand 832 included in the image 830 as a reference position related to the pointer 810.

According to an embodiment, in a state in which the point P5 in the FoV 260 is determined as the reference position based on the image 830, the electronic device 101 may display the pointer 810 on the reference position of the FoV 260 based on the touch input on the displaying area of the display 230. Referring to FIG. 8C, the electronic device 101 may display the pointer 810 on the point P5 of the FoV 260 based on identifying the touch input on the point P3 in the area 610 of the display 230 corresponding to the point P3' in the FoV 260. Similar to ceasing to transmit the image 820 of FIG. 8B, the electronic device 101 may request the wearable device 210 to cease transmitting the image 830 including external space, based on identifying the touch input on the point P3 in the area 610.

As described above, according to an embodiment, based on the touch input on the displaying area of display 230, the electronic device 101 may display the pointer 810 in the FoV 260 based on the position of the contact point of the touch input within the displaying area and/or the information received from the wearable device 210. As described above with reference to FIGS. 8B and 8C, when the reference position is identified from the information received from the wearable device 210, the position of the pointer 810 in the FoV 260 may be set to the reference position independently of the position of the contact point of the touch input. For example, the electronic device 101 may display the pointer 810 in association with the reference position included in the information received from the wearable device 210. As described above with reference to FIG. 8A, in a state (e.g., a state in which the reference position is not received from the wearable device 210) different from the state in which the information received from the wearable device 210 includes the reference position, the position of the pointer 810 in the FoV 260 may be set based on the position of the contact point of the touch input. For example, the electronic device 101 may obtain the position of the pointer 810 in the FoV 260 based on coordinate values of the contact point in the displaying area of the display 230.

As described above with reference to FIGS. 8A, 8B, and 8C, according to an embodiment, in response to the touch input on the displaying area of the display 230, the electronic device 101 may adjust the position of the pointer 810 in a plane coordinate system based on the preset two axes (e.g., the x-axis and the y-axis perpendicular to the x-axis). When the electronic device 101 is connected to an external electronic device different from the wearable device 210 (e.g., the external electronic device 220 of FIG. 2), based on the information received from the external electronic device, the electronic device 101 may adjust the position of the pointer 810 in the FoV 260 based on a spatial coordinate system that further includes other axes (e.g., the z-axis perpendicular to both the x-axis and the y-axis) different from the preset two axes. Hereinafter, referring to FIG. 9, an example of an operation in which the electronic device 101 connected to both the wearable device 210 and the external electronic device 220 adjusts the position of the pointer 810 displayed in the FoV 260 of the wearable device 210 based on the information received from the external electronic device 220 will be described.

Figure 9:
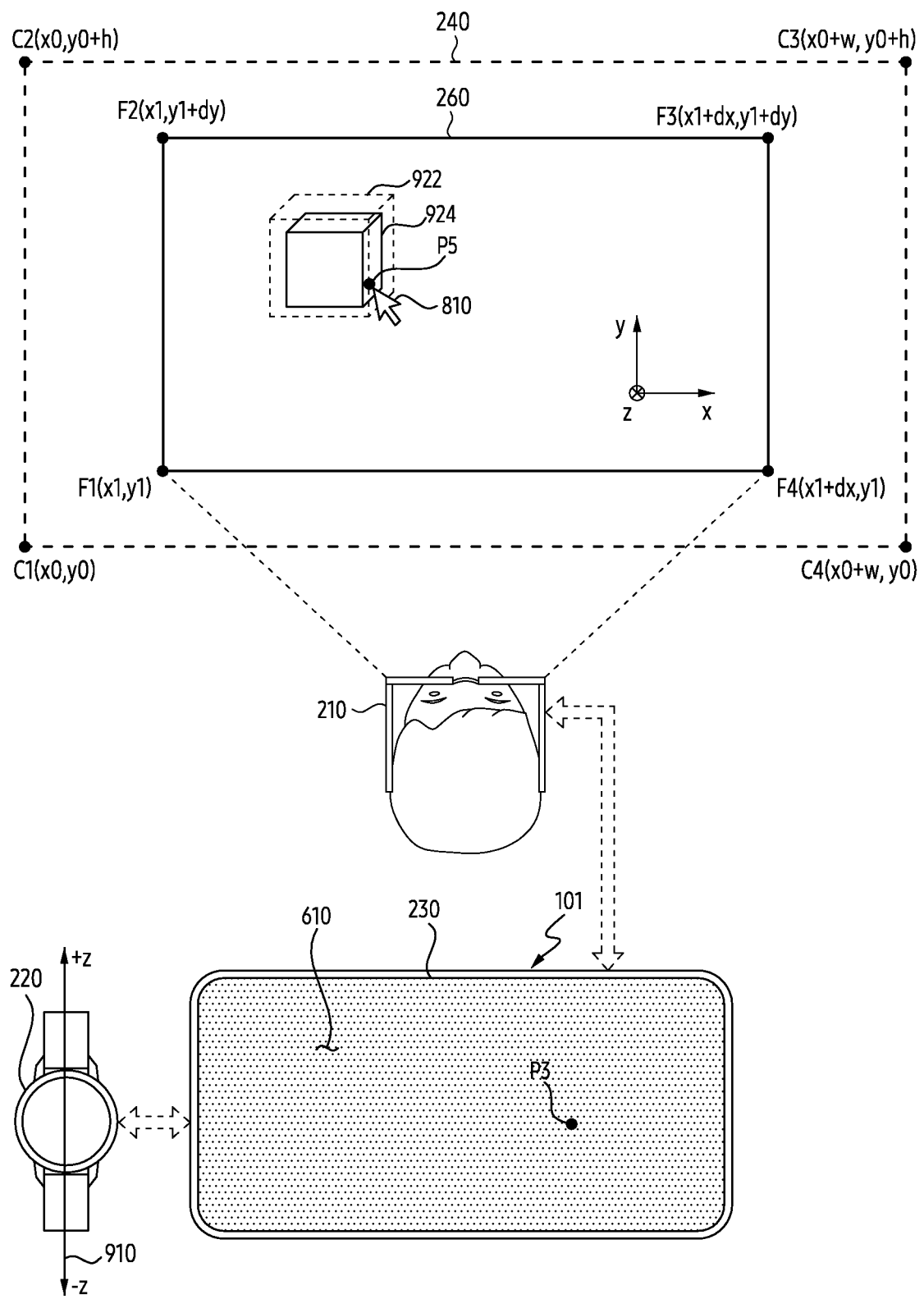
FIG. 9 illustrates an example of an operation in which an electronic device modifies a screen displayed in a FoV of a wearable device based on an external electronic device according to an embodiment.

FIG. 9 illustrates an example of an operation in which an electronic device 101 modifies a screen displayed in a FoV 260 of a wearable device 210 based on an external electronic device 220 according to an embodiment. The electronic device 101, the wearable device 210, and the external electronic device 220 of FIG. 9 may be an example of the electronic device 101, the wearable device 210, and the external electronic device 220 of FIG. 2. For example, the electronic device 101 and the display 230 of FIG. 2 may include the electronic device 101 and the display 230 of FIG. 9.

The electronic device 101 of FIG. 9 may be connected to the wearable device 210 and/or the external electronic device 220. The electronic device 101 connected to the wearable device 210 may receive information related to the wearable device 210 from the wearable device 210 based on the execution of the preset mode for controlling the wearable device 210. For example, the electronic device 101 may receive information (e.g., information indicating the gaze of the user wearing the wearable device 210 and/or the motion of the preset body part such as the hand) related to the FoV 260 of the wearable device 210 from the wearable device 210. The electronic device 101 may transmit a screen based at least on the information to the wearable device 210. The wearable device 210 may display the screen received from the electronic device 101 in the FoV 260. In a state of transmitting the screen to the wearable device 210, the electronic device 101 may identify an input indicating modification of the screen transmitted to the wearable device 210 based on the touch input on the displaying area of the display 230. For example, as described above with reference to FIGS. 7A and 7B, when receiving a touch input including a gesture registered by the user, the electronic device 101 may modify the screen transmitted to the wearable device 210 to a preset screen corresponding to the registered gesture. For example, as described above with reference to FIGS. 8A, 8B, and 8C, when a touch input for displaying a pointer (e.g., the pointer 810 of FIGS. 8A, 8B, and 8C) in the screen transmitted to the wearable device 210 is identified, the electronic device 101 may identify the position of the pointer in the FoV 260 based on the position of the contact point of the touch input and/or the information received from the wearable device 210. Based on the identified position, the electronic device 101 may combine a pointer within the screen transmitted to the wearable device 210.

Referring to FIG. 9, according to an embodiment, the electronic device 101 may adjust the position of the pointer 810 in the FoV 260 of the wearable device 210 based on the display 230 of the electronic device 101 and the external electronic device 220 connected to the electronic device 101. Although a smart watch is illustrated as an example of the external electronic device 220, an embodiment is not limited thereto, and the external electronic device 220 may include other smart accessories such as wireless earphones. As described above with reference to FIGS. 8A, 8B, and 8C, according to an embodiment, the electronic device 101 may display the pointer 810 on the point P5 of the FoV 260, by adjusting the screen transmitted to the wearable device 210 based on the touch input for the point P3 in the area 610 formed in the displaying area of the display 230. The electronic device 101 may process the touch input on the area 610, based on a two-dimensional coordinate system in the area 610. Since the touch input is processed based on the two-dimensional coordinate system, the electronic device 101 may move the pointer 810 displayed in the FoV 260 based on the touch input on the area 610 in accordance with the two-dimensional coordinate system formed in the FoV 260. For example, based on the touch input on the area 610 within the displaying area of the display 230, the electronic device 101 may move the pointer 810 in a virtual plane having a direction of the user's gaze as a normal vector within the FoV 260. According to an embodiment, the electronic device 101 may move the pointer 810 displayed in the FoV 260 within the space coordinate system including the two-dimensional coordinate system by using the external electronic device 220.

According to an embodiment, the electronic device 101 may receive information related to the movement of the pointer 810 from the external electronic device 220. For example, the electronic device 101 may receive information indicating the motion of the external electronic device 220 from an inertia measurement unit (IMU) sensor included in the external electronic device 220. For example, the electronic device 101 may receive information indicating a touch input performed on the display of the external electronic device 220. Referring to FIG. 9, it is assumed that the electronic device 101 identified the motion of the external electronic device 220 based on a preset axis 910 from the information received from the external electronic device 220. Based on identifying the motion of the external electronic device 220, the electronic device 101 may move the position of the pointer 810 displayed in the FoV 260 along a direction (e.g., the z-axis) perpendicular to the two-dimensional coordinate plane corresponding to the area 610.

Referring to FIG. 9, an exemplary case in which the electronic device 101 receives information indicating the motion of the external electronic device 220 in a state in which a visual object 922 in the FoV 260 is selected is illustrated. According to an embodiment, based on the information, the electronic device 101 may move the visual object 922 displayed in the FoV 260 along a direction (e.g., the z-axis) different from a movable direction based on the touch input on the area 610. Referring to FIG. 9, a visual object 924 may correspond to the visual object 922 moved along the z-axis based on the touch input. For example, the electronic device 101 may represent the visual object 922 moving along the z-axis based on the motion of the external electronic device 220, by adjusting the size of the visual object 922 in the screen transmitted to the wearable device 210. For example, the electronic device 101 may represent the visual object 922 moving along the z-axis by adjusting the binocular disparity (or difference) of the visual object 922 within the screen transmitted to the wearable device 210.

According to an embodiment, based on a multi-touch gesture performed on the area 610 of the display 230, the electronic device 101 may move the pointer 810 and/or the visual object 922 selected by the pointer 810 along a direction perpendicular to the two-dimensional coordinate plane corresponding to the area 610. For example, based on a touch input based on external objects simultaneously contacting two points in the area 610, the electronic device 101 may receive an input for moving the pointer 810 along a direction perpendicular to the two-dimensional coordinate plane. Since the electronic device 101 supports the movement of the pointer 810 based on the three-dimensional coordinate space by using the multi-touch gesture and/or the external electronic device 220, the electronic device 101 may provide a stereoscopic user experience based on the pointer 810 displayed in the FoV 260 of the wearable device 210.

As described above, according to an embodiment, in a state of identifying the external electronic device 220 different from the wearable device 210, the electronic device 101 may identify and/or adjust the position of the pointer 810 in the FoV 260 of the wearable device 210 based on the information received from the external electronic device 220. For example, based on the information received from the external electronic device 220, the electronic device 101 may move the pointer 810 along a second preset axis (e.g., the z-axis) different from a first preset axes (e.g., the x-axis and the y-axis) formed based on the area 610 of the display 230. For example, based on the motion of the external electronic device 220 indicated by the information, the electronic device 101 may identify second coordinate values, which is different from first coordinate values representing the position of the pointer 810 along the first preset axes based on the touch input on the area 610. Based on the first coordinate values and the second coordinate values, the electronic device 101 may identify the position of the pointer 810 in the FoV 260. The electronic device 101 may display the pointer 810 in the FoV 260 at the identified position by adjusting the screen transmitted to the wearable device 210 based on the position of the identified pointer 810. For example, the electronic device 101 may enter a mode for controlling the wearable device 210 based on the connection between the wearable device 210 and the electronic device 101. When connected to the wearable device 210 in the state in which the external electronic device 220 is identified, the electronic device 101 may enter a mode for controlling the wearable device 210 based on the input identified through the external electronic device 220 and the electronic device 101.

Hereinafter, referring to FIGS. 10A, 10B, and 10C, according to an embodiment, an example of an operation in which the electronic device 101 modifies the screen displayed in the FoV 260 of the wearable device 210 based on the input received through the display 230 and/or the external electronic device 220 will be described.

Figure 10A:
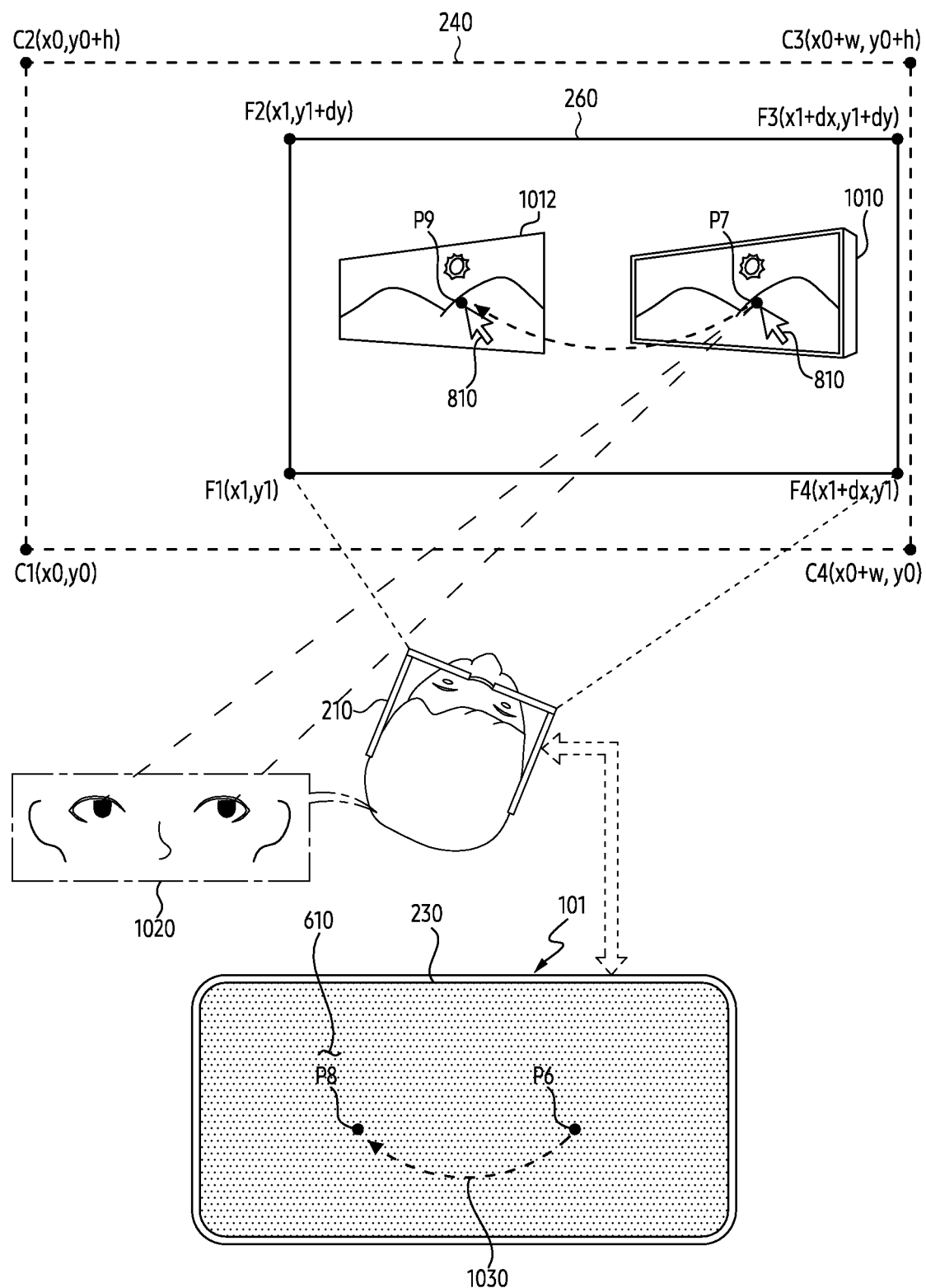
FIGS. 10A, 10B, and 10C illustrate an example of an operation in which an electronic device modifies a screen displayed in the FoV of a wearable device based on an input received through a displaying area of a display and/or an external electronic device connected to the electronic device according to an embodiment.
Figure 10B:
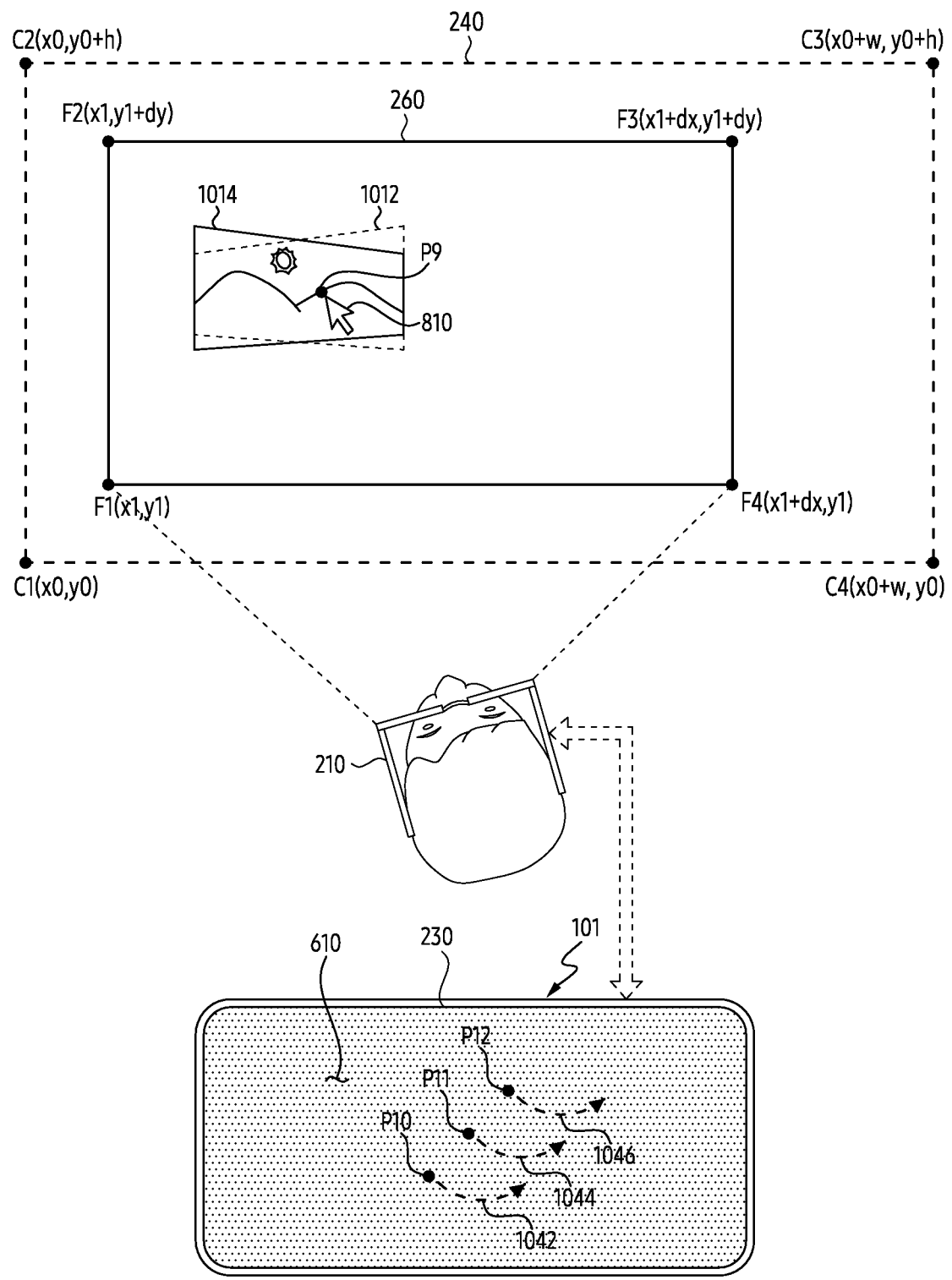
Figure 10C:
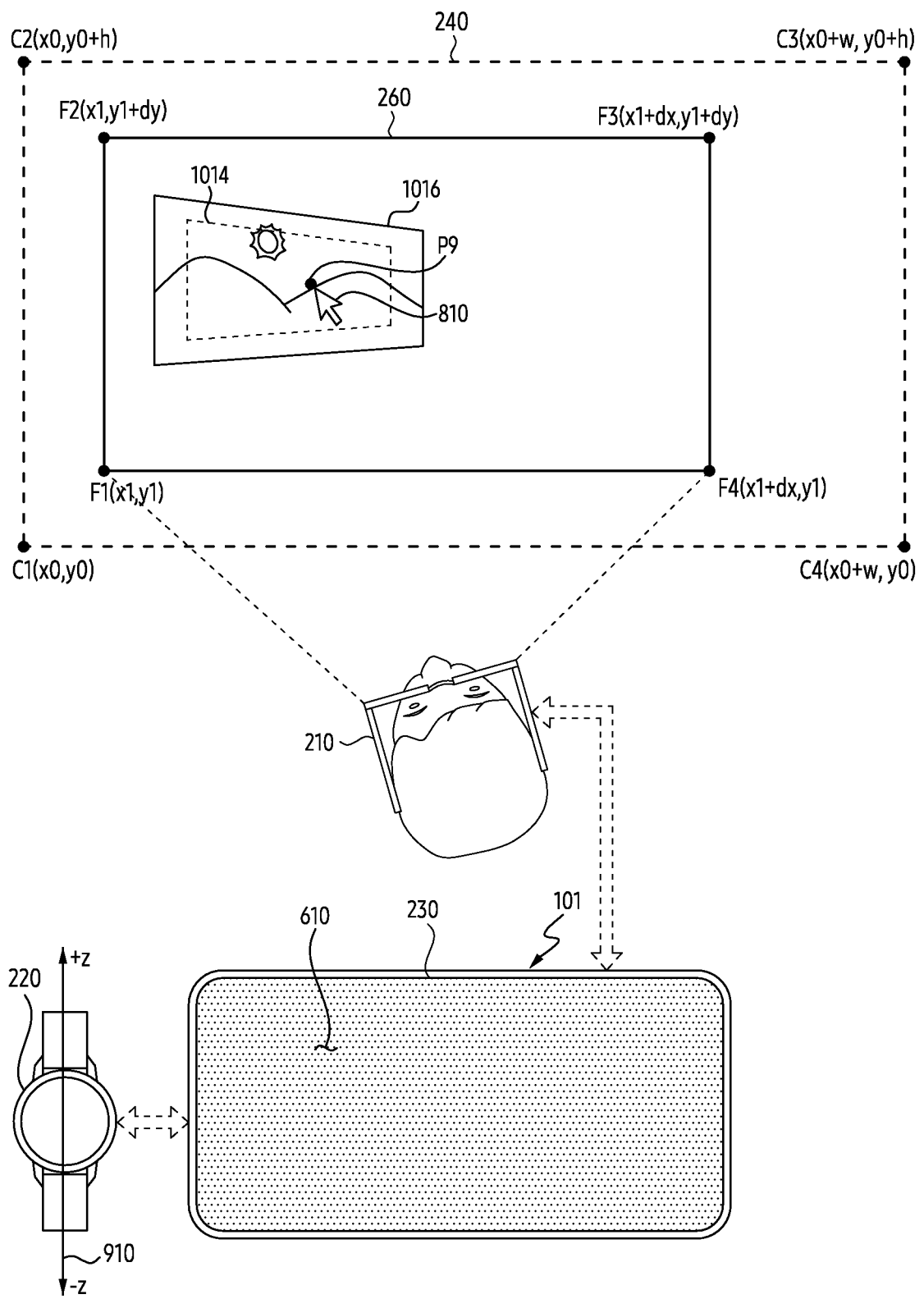

FIGS. 10A, 10B, and 10C illustrate an example of an operation in which an electronic device 101 modifies a screen displayed in the FoV 260 of a wearable device 210 based on an input received through a displaying area of a display 230 and/or an external electronic device 220 connected to the electronic device 101 according to an embodiment. The electronic device 101, the wearable device 210, and the external electronic device 220 of FIG. 2 may include an electronic device 101, a wearable device 210, and an external electronic device 220 of FIGS. 10A, 10B, and 10C.

Referring to FIG. 10A, according to an embodiment, based on identifying the wearable device 210, the electronic device 101 may receive information indicating the motion of the wearable device 210, a gaze, and/or a gesture of the user wearing the wearable device 210 from the wearable device 210. The electronic device 101 may obtain a screen to be displayed in the FoV 260 of the wearable device 210 based on the motion of the wearable device 210 (e.g., a front direction of the user wearing the wearable device 210) included in the information. The electronic device 101 may identify a reference position in the FoV 260 at which the user gazes, based on information indicating the user's gaze and/or gesture included in the information.

According to an embodiment, based on identifying the wearable device 210, the electronic device 101 may cease to display a screen based on an application executed by the electronic device 101 through the display 230. For example, the electronic device 101 may transmit information for displaying a screen based on the application to the wearable device 210. In an embodiment, the electronic device 101 may transmit the information divided based on the maximum size of the packet capable of transmitting the wearable device 210 by using a plurality of packets. In an embodiment, the electronic device 101 may transmit to the wearable device 210 a signal including at least one of a screen to be displayed within the FoV 260, an audio to be outputted through a speaker of the wearable device 210, and/or a command related to the wearable device 210. The wearable device 210 may obtain a screen to be displayed in the FoV 260 based on a signal received from the electronic device 101.

Referring to FIG. 10A, according to an embodiment, the electronic device 101 may identify an external electronic device 1010 displayed through the FoV 260. The electronic device 101 may identify the external electronic device 1010 positioned within the FoV 260 based on information on the FoV 260 of the wearable device 210. For example, the electronic device 101 may identify the external electronic device 1010 within the FoV 260 based on a beacon signal received from the external electronic device 1010. For example, the external electronic device 1010 may be identified by the electronic device 101 based on the account information commonly logged into the external electronic device 1010 and the electronic device 101 and/or a communication link (e.g., a communication link established based on pairing) between the electronic device 101 and the external electronic device 1010. Although an example of an external electronic device 1010 based on a television (TV) is illustrated, an embodiment is not limited thereto.

Referring to FIG. 10A, according to an embodiment, the electronic device 101 may receive an image 1020 including at least one pupil of the user from the wearable device 210. Based on the at least one pupil included in the image 1020, the electronic device 101 may identify a direction of a gaze of a user wearing the wearable device 210. For example, the electronic device 101 may identify the direction of the gaze looking at point P7 in the FoV 260. According to an embodiment, the electronic device 101 may identify the point P7 as a reference position related to the pointer 810, based on the direction of the gaze.

Referring to FIG. 10A, according to an embodiment, in a state connected to the wearable device 210, the electronic device 101 may display a preset screen in the display 230 to receive an input related to a screen to be displayed through the wearable device 210. The electronic device 101 may form the area 610 in the displaying area of the display 230 based on the preset screen. In an embodiment of FIG. 10A, the electronic device 101 may receive a touch input to a point P6 in the area 610. Based on the touch input to the point P6, the electronic device 101 may display the pointer 810 within the FoV 260 of the wearable device 210. In an exemplary case in which point P7 is identified as a reference position based on the image 1020, the electronic device 101 may display the pointer 810 on the point P7 of FoV 260 in response to the touch input to the point P6 in area the 610.

According to an embodiment, the electronic device 101 may identify an input indicating that a visual object displayed in the FoV 260 is selected, based on the pointer 810 displayed in the FoV 260 of the wearable device 210. For example, based on identifying the external electronic device 1010 overlapped with the pointer 810 within the FoV 260, the electronic device 101 may identify an input indicating that the external electronic device 1010 is selected based on the pointer 810. After receiving the input indicating that the external electronic device 1010 is selected, the electronic device 101 may execute a function related to the external electronic device 1010 based on a gesture performed on the area 610 of the display 230. For example, the external electronic device 1010 may be connected to the electronic device 101 based on at least one of pairing with the electronic device 101 or logging in to a network service based on the user account of the electronic device 101.

Referring to FIG. 10A, according to an embodiment, the electronic device 101 may receive a touch input dragged from the point P6 to the point P8 along a path 1030 within the area 610. Based on the touch input, the electronic device 101 may move a visual object (e.g., a visual object 1012) representing an image of the external electronic device 1010 selected by the pointer 810 within the FoV 260 of the wearable device 210. For example, the electronic device 101 may move the visual object 1012 corresponding to a video displayed by the external electronic device 1010 to the point P9 corresponding to an end point P8 of the path 1030 in the FoV 260. Referring to FIG. 10A, a state in which the electronic device 101 displays the visual object 1012 corresponding to the video displayed by the external electronic device 1010 at point P9 of the FoV 260 of the wearable device 210 based on the screen transmitted to the wearable device 210 is illustrated as an example. The visual object 1012 may include the video displayed by the external electronic device 1010. The visual object 1012 may be a virtual object displayed by the wearable device 210 controlled by the electronic device 101.

Referring to FIG. 10B, in a state in which the visual object 1012 is displayed in the FoV 260 of the wearable device 210, the electronic device 101 may receive input to move and/or rotate the visual object 1012 through the area 610 formed in the displaying area of the display 230. Referring to FIG. 10B, the electronic device 101 may receive an input to rotate the visual object 1012 displayed in the FoV 260 along the preset axis, through the area 610. The input may include a gesture in which external objects (e.g., user's fingertips) in substantially simultaneous contact with different points P10, P11, and P12 within the area 610 are dragged along trajectories 1042, 1044, and 1046. Based on the input including the gesture, the electronic device 101 may rotate the visual object 1012 displayed in the FoV 260 of the wearable device 210 in three dimensions by controlling the screen transmitted to the wearable device 210. A visual object 1014 displayed in the FoV 260 of FIG. 10B may correspond to a result of the electronic device 101 rotating the visual object 1012, based on the input including the gesture. Referring to FIG. 10B, while rotating the visual object 1012 based on the input including the gesture, the position of the pointer 810 displayed in the FoV 260 of the wearable device 210 may be maintained on the point P9.

Referring to FIG. 10C, according to an embodiment, in a state in which the visual object 1014 corresponding to the result of rotating the visual object 1012 of FIG. 10B is displayed, the electronic device 101 may receive an input to move the visual object 1014 along the preset axis by using the external electronic device 220 connected to the electronic device 101. The preset axis may be different from the two-dimensional axes used to display the pointer 810 based on the area 610 of the display 230. For example, when the two-dimensional axes include the x-axis and the y-axis, the preset axis may include the z-axis perpendicular to both the x-axis and the y-axis. According to an embodiment, based on information indicating the motion (e.g., the motion of the external electronic device 220 moving along the preset axis 910) of the external electronic device 220, the electronic device 101 may move the visual object 1014 selected based on the pointer 810 along the preset axis in the FoV 260. Referring to FIG. 10C, the visual object 1016 may indicate a result of moving the visual object 1014 along the preset axis based on information indicating the motion of the external electronic device 220. For example, the electronic device 101 may indicate a result of moving the visual object 1014 along the preset axis based on the size of the visual object 1016 displayed within the FoV 260 of the wearable device 210 and/or binocular disparity.

As described above, according to an embodiment, the electronic device 101 may obtain a screen to be displayed in the FoV 260 of the wearable device 210 based on the information received from the wearable device 210 and the application executed by the electronic device 101. Since the electronic device 101 among the electronic device 101 and the wearable device 210 obtains a screen to be displayed in the FoV 260 of the wearable device 210, the amount of calculation (e.g., processing), (electrical) current consumption, and/or heat generation of the wearable device 210 may be reduced. When generating a screen to be displayed in the FoV 260 of the wearable device 210, the electronic device 101 may add the pointer 810 in the screen, based on the touch input on the displaying area of the display 230 of the electronic device 101 or information received from the external electronic device 220 connected to the electronic device 101. In an embodiment, the position of the pointer 810 in the FoV 260 may be adjusted based on information indicating the user's gaze and/or motion received from the wearable device 210. For example, when information indicating the gaze and/or motion of the user wearing the wearable device 210 is received from the wearable device 210, the electronic device 101 may display the pointer 810 on a reference position in the FoV 260 based on the information. The reference position may include a point within the FoV 260 focused by the user. For example, when other information different from the information is received from the wearable device 210, the electronic device 101 may identify the position in the FoV 260 corresponding to the position of the contact point of the touch input, based on the relationship between the displaying area of the display 230 and the FoV 260. The electronic device 101 may display the pointer 810 on the identified position within the screen transmitted to the wearable device 210.

Hereinafter, an operation of the electronic device 101 according to an embodiment will be described with reference to FIGS. 11, 12, 13, and 14.

Figure 11:
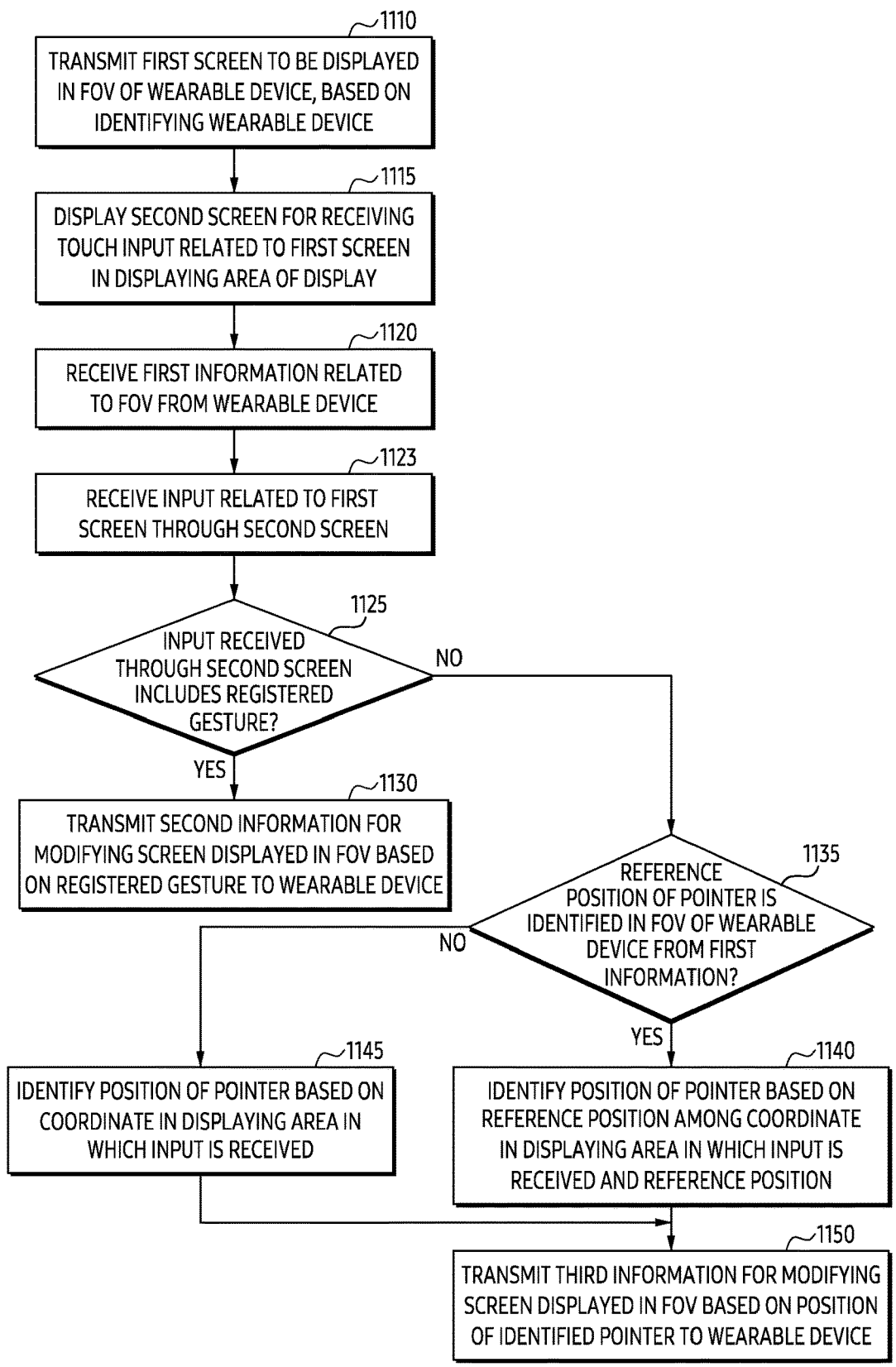
FIG. 11 illustrates an example of a flowchart for describing an operation of an electronic device, according to an embodiment.

FIG. 11 illustrates an example of a flowchart for describing an operation of an electronic device, according to an embodiment. The electronic device of FIG. 11 may include the electronic device 101 of FIGS. 1 to 9 and/or FIGS. 10A, 10B, and 10C. One or more operations of FIG. 11 may be performed by the electronic device 101 and/or the processor 120 of FIG. 5. The order of operations illustrated in FIG. 11 is not limited to an embodiment of FIG. 11. For example, at least two of the operations of FIG. 11 may be performed substantially simultaneously.

Referring to FIG. 11, in operation 1110, according to an embodiment, the electronic device may transmit a first screen to be displayed in the FoV (e.g., the FoV 260 of FIG. 2) of the wearable device, based on identifying the wearable device (e.g., the wearable device 210 of FIG. 2). The electronic device may identify the wearable device 210 of FIG. 2 by using the communication circuit 510 of FIG. 5. Based on one or more applications executed by the processor (e.g., the processor 120 of FIG. 5) of the electronic device, the electronic device may obtain the first screen.

Referring to FIG. 11, in operation 1115, according to an embodiment, the electronic device may display a second screen for receiving a touch input related to a first screen in the displaying area of the display. In the display (e.g., the display 230 of FIG. 2 and/or FIG. 5), the electronic device may display the second screen in which an area (e.g., the area 610 of FIGS. 6A, 6B, and 6C) for receiving the touch input is formed, based on the transmission of the first screen in operation 1110.

Referring to FIG. 11, in operation 1120, according to an embodiment, the electronic device may receive first information related to FoV from the wearable device. The first information may include a motion of the wearable device. Based on the motion of the wearable device included in the first information, the electronic device may obtain the first screen of operation 1110. For example, while the wearable device and the electronic device are connected, the electronic device may repeatedly perform operations 1110, 1115, and 1120.

While repeatedly performing operations 110, 1115, and 1120, the electronic device may receive a touch input related to the first screen through the second screen in operation 1123. Referring to FIG. 11, in operation 1125, according to an embodiment, the electronic device may determine whether the input received through the second screen includes a registered gesture. In response to receiving an input including the registered gesture through the second screen (1125-YES), in operation 1130, according to an embodiment, the electronic device may transmit the second information for modifying the first screen displayed in the FoV to the wearable device based on the registered gesture. For example, the second information may include an image encoded by the execution of the image encoder 550 of FIG. 5. The registered gesture may be registered in the electronic device based on operation described above with reference to FIG. 7A. In response to the input including the registered gesture, the electronic device may execute a function assigned to the registered gesture. The electronic device may transmit a screen corresponding to the executed function to the wearable device. The second information may include information for displaying the screen corresponding to the executed function. Since the wearable device displays a screen corresponding to the executed function in the FoV, the electronic device may modify the first screen displayed in the FoV of the wearable device based on the second screen displayed through the display.

In response to receiving an input including a gesture different from the registered gesture through the second screen (1125-NO), in operation 1135, according to an embodiment, the electronic device may determine whether the reference position of the pointer is identified within the FoV of the wearable device from the first information. For example, when the first information includes information indicating gaze of the user of the wearable device, the electronic device may identify the reference position based on the information indicating the gaze. For example, when the first information includes an image in which a preset body part such as a hand is captured, the electronic device may identify the reference position based on a direction of the hand identified from the image. When the first information does not include information indicating the gaze or the first information does not include the image in which the preset body part is captured, the electronic device may determine that the reference position is not identified from the first information.

When the reference position of the pointer is not identified based on the first information (1135-NO), in operation 1145, according to an embodiment, the electronic device may identify the position of the pointer based on a coordinate in the displaying area in which the input is received. For example, based on an operation described above with reference to FIG. 8A, the electronic device may identify the position of the pointer in the FoV of the wearable device.

When the reference position of the pointer is identified based on the first information (1135-YES), in operation 1140, according to an embodiment, the electronic device may identify the position of the pointer based on the reference position among the coordinates in the displaying area in which the input is received and the reference positions. For example, based on an operation the described above with reference to FIGS. 8B and 8C, the electronic device may identify the reference position in the FoV as the position of the pointer.

Referring to FIG. 11, in operation 1150, according to an embodiment, the electronic device may transmit third information for modifying the screen displayed in the FoV based on the position of the identified pointer to the wearable device. When the position of the pointer is identified based on operation 1145, the electronic device may display the pointer on a position corresponding to an input received through the second screen, in the FoV of the wearable device based on the third information. When the position of the pointer is identified based on operation 1140, the electronic device may display the pointer in the reference position in the FoV of the wearable device.

Figure 12:
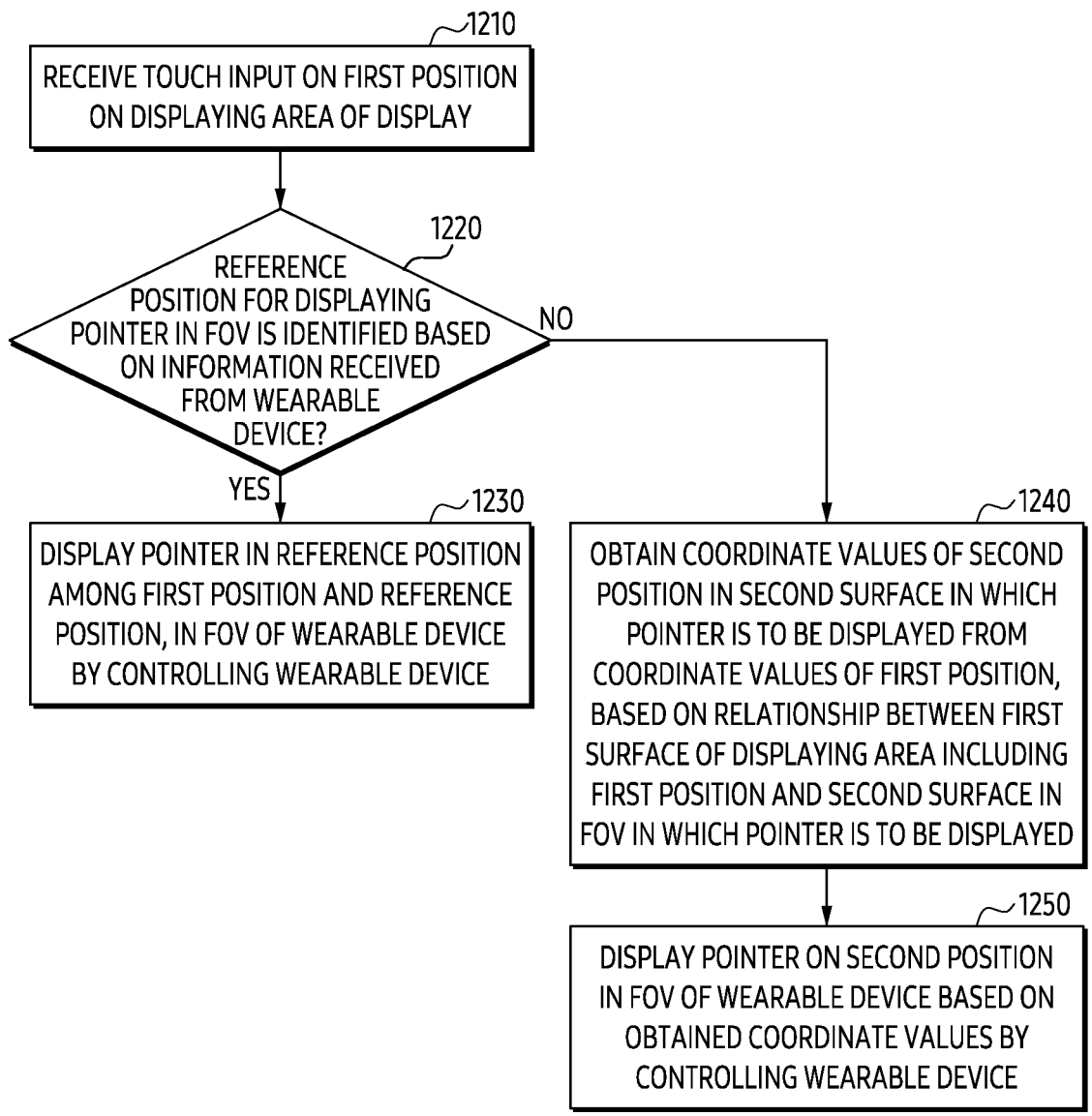
FIG. 12 illustrates an example of a flowchart for describing an operation of an electronic device, according to an embodiment.

FIG. 12 illustrates an example of a flowchart for describing an operation of an electronic device, according to an embodiment. The electronic device of FIG. 12 may include the electronic devices of FIGS. 1 to 11. One or more operations of FIG. 12 may be performed by the electronic device 101 and/or the processor 120 of FIG. 5. At least one of operations of FIG. 12 may be related to at least one of operations of FIG. 11. The order of the operations illustrated in FIG. 12 is not limited to an embodiment of FIG. 12. For example, at least two of the operations of FIG. 12 may be performed substantially simultaneously.

Referring to FIG. 12, in operation 1210, according to an embodiment, the electronic device may receive the touch input on the first position on the displaying area of the display. The electronic device may receive a touch input of operation 1210 in a state of being connected to the wearable device. For example, the electronic device may receive the touch input of operation 1210 while the operations 1110, 1115, and 1120 of FIG. 11 are performed.

Referring to FIG. 12, in operation 1220, according to an embodiment, the electronic device may determine whether the reference position for displaying a pointer within the FoV is identified based on information received from the wearable device. The reference position of operation 1220 may include the reference position of operation 1135 of FIG. 11. For example, the reference position may correspond to a point focused by the user within the FoV.

When the reference position of operation 1220 is identified based on the information received from the wearable device (1220-YES), in operation 1230, according to an embodiment, the electronic device may display a pointer in the reference position among the first position and reference position, in the FoV of the wearable device by controlling the wearable device. For example, the electronic device may display the pointer in the reference position in the FoV of the wearable device by controlling the screen transmitted to the wearable device. In a state of identifying the position of the pointer based on the reference position, such as operations 1220 and 1230, in response to a touch input for moving the pointer, the electronic device may transmit a preset parameter for at least temporarily ceasing to transmit information indicating the reference position, to the wearable device.

When the reference position of operation 1220 is not identified based on the information received from the wearable device (1220-NO), in operation 1240, according to an embodiment, the electronic device may obtain coordinate values of the second position in the second surface in which the pointer is to be displayed from coordinate values of the first position, based on a relationship between the first surface of the displaying area including the first position and the second surface in the FoV in which the pointer is to be displayed. For example, the electronic device may obtain the coordinate values of the second position by adjusting the coordinate values of the first position based on the mapping between the first surface and the second surface.

Referring to FIG. 12, in operation 1250, according to an embodiment, the electronic device may control the wearable device to display a pointer on the second position in the FoV of the wearable device based on the obtained coordinate values. Since the coordinate values of the second position are obtained based on the coordinate values of the first position in the displaying area in which the touch input is received, the first position receiving the touch input and the second position of the pointer in the second surface of the FoV may correspond to each other in the first surface of the displaying area. A state in which a pointer is displayed based on operations 1240 and 1250 of FIG. 12 may include the state of FIG. 8A. A state in which a pointer is displayed based on operation 1230 of FIG. 12 may include the state of FIGS. 8B to 8C.

Figure 13:
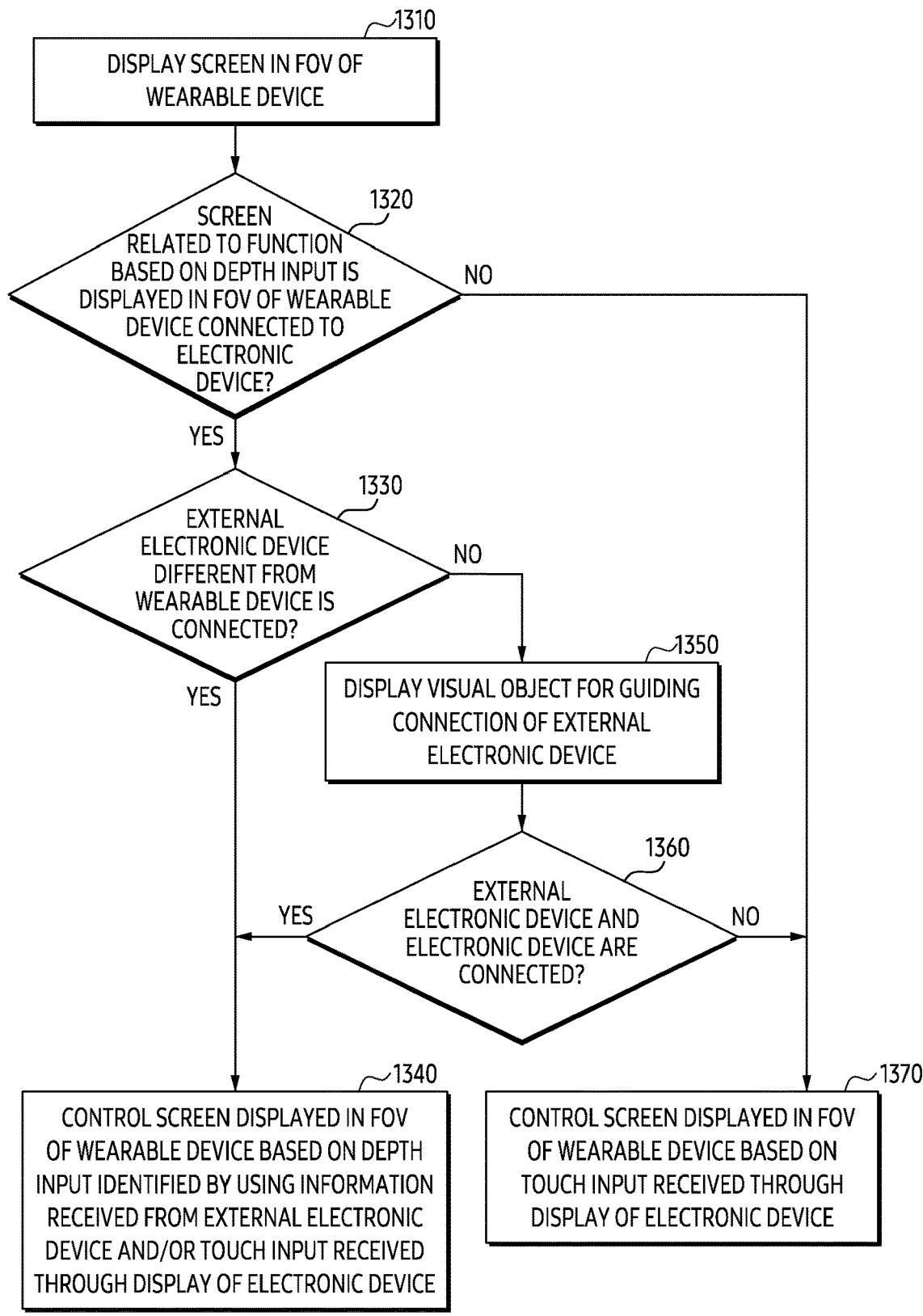
FIG. 13 illustrates an example of a flowchart for describing an operation of an electronic device, according to an embodiment.

FIG. 13 illustrates an example of a flowchart for describing an operation of an electronic device, according to an embodiment. The electronic device of FIG. 13 may include the electronic devices of FIGS. 1 to 12. One or more operations of FIG. 13 may be performed by the electronic device 101 and/or the processor 120 of FIG. 5. The operations of FIG. 13 may be related to at least one of the operations of FIGS. 11 to 12. The order of the operations illustrated in FIG. 13 is not limited to an embodiment of FIG. 13. For example, at least two of the operations of FIG. 13 may be performed substantially simultaneously.

Referring to FIG. 13, in operation 1310, according to an embodiment, the electronic device may display a screen in the FoV of the wearable device. The electronic device may perform operation 1310 similar to operation 1110 of FIG. 11.

Referring to FIG. 13, in operation 1320, according to an embodiment, the electronic device may determine whether a screen related to a function based on a depth input is displayed in the FoV of the wearable device connected to the electronic device. For example, the screen may be displayed based on an application supporting the movement of a virtual object displayed in FoV based on the depth input. The screen may include a screen illustrated in FIGS. 9, 10A, 10B, and 10C. For example, based on an application executed by the electronic device, the electronic device may transmit the screen related to the function based on the depth input to the wearable device. The depth input may cause movement of a visual object based on a three-dimensional space coordinate in the FoV of the wearable device.

When the screen related to the function based on the depth input is displayed in the FoV of the wearable device (1320-YES), in operation 1330, according to an embodiment, the electronic device may determine whether an external electronic device different from the wearable device is connected. The external electronic device of operation 1330 may include, for example, the external electronic device 220 of FIG. 2.

In response to identifying the external electronic device connected to the electronic device (1330-YES), in operation 1340, according to an embodiment, the electronic device may control a screen displayed in the FoV of the wearable device based on the depth input identified by using the information received from the external electronic device and/or the touch input received through the display of the electronic device. For example, based on the touch input received through the display of the electronic device, the electronic device may move the pointer based on a two-dimensional plane within the FoV. For example, based on information received from the external electronic device, the electronic device may move the pointer based on an axis perpendicular to the two-dimensional plane. For example, the electronic device may move the pointer in three dimensions based on information received from the external electronic device.

When the external electronic device connected to the electronic device is not present (1330-NO), in operation 1350, according to an embodiment, the electronic device may display a visual object for guiding a connection of the external electronic device. The electronic device may display the visual object (e.g., a pop-up window) for guiding the connection between the external electronic device and the electronic device in the FoV of the wearable device in operation 1310.

Referring to FIG. 13, in operation 1360, according to an embodiment, the electronic device may determine whether the external electronic device and the electronic device are connected. When the external electronic device is connected (1360-YES), the electronic device may control the screen displayed in the FoV of the wearable device based on information received from the external electronic device based on operation 1340. When the external electronic device is not connected (1360-NO) or another screen different from the screen related to the function based on the depth input is displayed within the FoV of the wearable device (1320-NO), in operation 1370, according to an embodiment, the electronic device may control the screen displayed in the FoV of the wearable device based on the touch input received through the display of the electronic device. For example, the electronic device may control the screen displayed in the FoV of the wearable device based on the touch input received through the display based on the operations of FIGS. 11 to 12.

Figure 14:
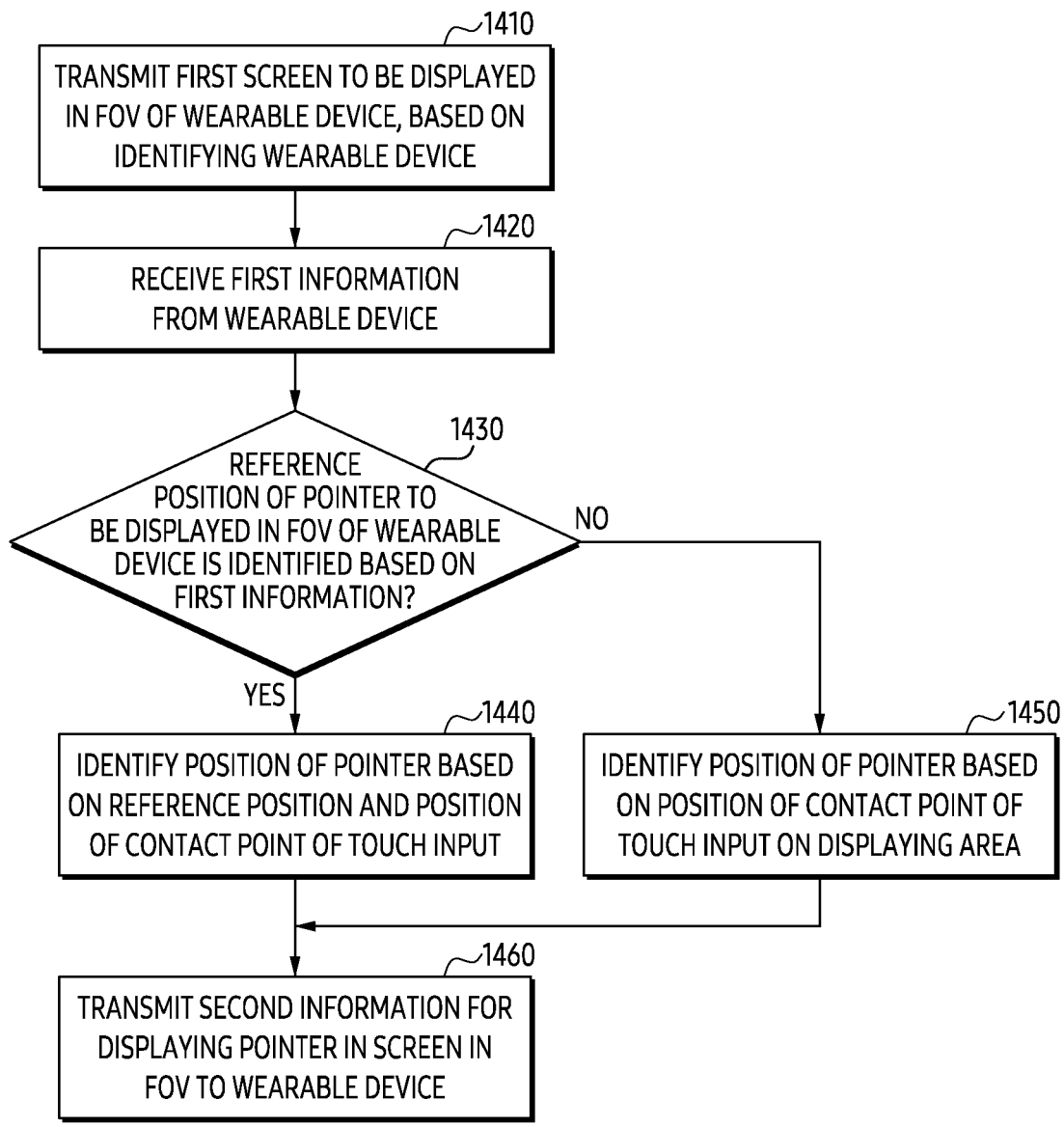
FIG. 14 illustrates an example of a flowchart for describing an operation of an electronic device, according to an embodiment.

FIG. 14 illustrates an example of a flowchart for describing an operation of an electronic device, according to an embodiment. The electronic device of FIG. 14 may include the electronic devices of FIGS. 1 to 13. One or more operations of FIG. 14 may be performed by the electronic device 101 and/or the processor 120 of FIG. 5. The operations of FIG. 14 may be related to at least one of the operations of FIGS. 11 to 13. The order of the operations illustrated in FIG. 14 is not limited to an embodiment of FIG. 14. For example, at least two of the operations of FIG. 14 may be performed substantially simultaneously.

Referring to FIG. 14, in operation 1410, according to an embodiment, the electronic device may transmit the first screen to be displayed in the FoV of the wearable device, based on identifying the wearable device. The electronic device may perform operation 1410 similar to operation 1110 of FIG. 11.

Referring to FIG. 14, in operation 1420, according to an embodiment, the electronic device may receive first information related to the wearable device. For example, the first information may include at least one of information indicating the motion of the wearable device, the gaze of the user wearing the wearable device, and/or the gesture (e.g., the gesture of the user's hand). The electronic device may perform operation 1420 similar to operation 1120 of FIG. 11.

Referring to FIG. 14, in operation 1430, according to an embodiment, the electronic device may determine whether the reference position of the pointer to be displayed in the FoV of the wearable device is identified based on the first information of operation 1420. Based on identifying the point focused by the user within the FoV of the wearable device, the electronic device may determine the point as the reference position from the first information.

In response to identifying the reference position based on the first information (1430-YES), in operation 1440, according to an embodiment, the electronic device may identify the position of the pointer based on the reference position and the position of the contact point of the touch input. In operation 1460 after operation 1440, the electronic device may transmit the second information for displaying the pointer in the screen within the FoV to the wearable device. For example, the pointer may be displayed in the FoV of the wearable device based on the reference position and the position of the contact point. Based on operations 1440 and 1460, the electronic device may move the pointer displayed in the reference position within the FoV of the wearable device, based on the movement of the contact point of the touch input, in the FoV.

When the reference position is not identified based on the first information (1430-NO), in operation 1450, according to an embodiment, the electronic device may identify the position of the pointer based on the position of the contact point of the touch input on the displaying area. Based on the position of the identified pointer, in operation 1460, the electronic device may transmit the second information for displaying the pointer in the screen within the FoV of the wearable device to the wearable device. Based on operations 1450 and 1460, the electronic device may display the pointer in a point within the FoV corresponding to the position of the contact point in the displaying area.

As described above, according to an embodiment, the electronic device may control the wearable device to display the screen in the FoV of the wearable device. The electronic device may receive an input for controlling the screen displayed in the FoV of the wearable device by using the displaying area of the display of the electronic device. When the input includes a specific gesture assigned to a specific function of the electronic device, the electronic device may modify the screen displayed in the FoV based on the execution of the specific function. When the input is related to the pointer in the screen, the electronic device may adjust the position of the pointer to be displayed in the FoV of the wearable device, based on the position within the displaying area received the input and/or the reference position received from the wearable device. While adjusting the position of the pointer based on the reference position, the electronic device may transmit a signal for ceasing the transmission of information (e.g., an image that captures at least one pupil of the user) related to the reference position by the wearable device, to the wearable device. When connected to an external electronic device different from the wearable device, the electronic device may move the pointer to a dimension (e.g., three dimensions based on the z-axis) different from movable dimensions (e.g., two dimensions formed by the x-axis and the y-axis) by using the displaying area, based on information received from the external electronic device.

A method for displaying a screen in the FoV of the wearable device by using the electronic device connected to the wearable device may be required.

As described above, according to an embodiment, an electronic device (e.g., the electronic device 101 of FIG. 2) may comprise a communication circuitry (e.g., the communication circuit 510 of FIG. 5), a display (e.g., the display 230 of FIG. 5), and a processor (e.g., the processor 120 of FIG. 5). The processor may be configured to display, by controlling a wearable device (e.g., the wearable device 210 of FIGS. 2 to 5) identified through the communication circuitry, at least portion of a first screen in a field-of-view (FoV) (e.g., FoV 260 of FIG. 2) of the wearable device. The processor may be configured to display, while identifying that the at least portion of the first screen is displayed by the wearable device, a second screen for receiving a touch input associated with the first screen in a displaying area of the display. The processor may be configured to receive first information for identifying a reference position of a pointer (e.g., pointer 270 in FIG. 2) in the FoV from the wearable device. The processor may be configured to obtain, in a first state identifying the reference position based on the received first information, a position of the pointer in the FoV based on the reference position and a position of a contact point of the touch input on the second screen. The processor may be configured to obtain, in a second state different from the first state, a position of the pointer in the FoV based on the position of the contact point. The processor may be configured to transmit, to the wearable device, second information for displaying the pointer in the first screen in the FoV based on the obtained position. According to an embodiment, the electronic device may display a screen based on the touch input received through the display of the electronic device in the FoV of the wearable device.

For example, the processor may be configured to transmit, in response to identifying a preset gesture based on the contact point on the displaying area, third information for displaying a preset screen based on the preset gesture in the FoV independently from identifying the position of the pointer to the wearable device.

For example, the processor may be configured to identify, from the first information, a first coordinate indicating the reference position in the FoV. The processor may be configured to transmit, based on identifying the touch input on the displaying area in a state identifying the first coordinate, the second information for displaying the pointer on the first coordinate to the wearable device.

For example, the processor may be configured to, based on identifying modification of a position of the contact point based on the touch input, transmit, to the wearable device, the second information for moving the pointer displayed on the first coordinate based on the position of the contact point modified in the displaying area.

For example, the processor may be configured to identify, based on a direction of gaze of a user wearing the wearable device that is identified from the first information, the reference position in the FoV. The processor may be configured to, in the first state, transmit, to the wearable device, the second information for displaying the pointer based on the direction of the gaze.

For example, the processor may be configured to obtain an image of an external space captured along a preset direction of the wearable device from the first information. The processor may be configured to identify, based on identifying a preset body part in the obtained image, a position of the preset body part identified in the image as the reference position. The processor may be configured to, in the first state, transmit, to the wearable device, the second information for displaying the pointer on the position of the body part identified in the image that is identified as the reference position.

For example, the processor may be configured to, in the first state identifying the position of the pointer based on the reference position, transmit, to the wearable device, the second information including a preset parameter for at least temporary ceasing to transmit the first information indicating the reference position.

For example, the processor may be configured to transmit, to the wearable device, the preset parameter for indicating deactivation of at least one camera disposed toward pupil of a user in a state that the wearable device is worn by the user.

For example, the processor may be configured to, in response to receiving the first information different from the reference position, identify, based on relationship between a first surface in the displaying area and a second surface viewable through the FoV, the position of the pointer in the second surface corresponding to the position of the contact point on the first surface.

For example, the processor may be configured to obtain, based on a first plane coordinates indicating the position of the contact point based on the first surface, a second plane coordinates indicating the position of the pointer in the second surface. The processor may be configured to transmit an image including the pointer positioned at the obtained second plane coordinates, to the wearable device based on the second information.

For example, the processor may be configured to receive, in a state identifying an external electronic device different from the wearable device through the communication circuitry, third information from the external electronic device. The processor may be configured to identify the position of the pointer in the FoV based on the received third information.

For example, the processor may be configured to identify first coordinate values indicated in a first preset axis based on the position of the contact point. The processor may be configured to identify a second coordinate value indicated in a second preset axis different from the first preset axis based on motion of the external electronic device indicated by the third information. The processor may be configured to identify the position of the pointer based on the first coordinate values and the second coordinate value.

For example, the processor may be configured to identify, from the first information received from the wearable device, the motion of the wearable device. The processor may be configured to select, in the displaying area formed by one or more applications executed by the processor, the at least portion of the first screen to be displayed in the FoV based on the identified motion.

As described above, according to an embodiment, a method of an electronic device may comprise executing, based on identifying a wearable device in a predetermined state through a communication circuitry in the electronic device, a preset mode for displaying a screen in a field-of-view (FoV) of the wearable device based on the electronic device. The method may comprise receiving, based on execution of the preset mode, information associated with the FoV from the wearable device. The method may comprise transmitting, to the wearable device by using a communication link established between the electronic device and the wearable device through the communication circuitry, the screen at least based on the received information. The method may comprise in a state transmitting the screen to the wearable device, receiving, based on a touch input on a displaying area of a display in the electronic device, an input indicating to modify the screen that is transmitted through the communication link. The method may comprise modifying, based on receiving the input indicating to display a preset screen, the screen that is transmitted through the communication link to the preset screen indicated by the input. The method may comprise combining, based on receiving the input indicating to display a pointer in the screen, the pointer and the screen based on a position of a contact point of the touch input associated with the input, and the received information.

For example, the modifying may comprise executing, based on receiving the input including a pre-registered gesture, application corresponding to the preset screen corresponding to the pre-registered gesture. The modifying may comprise modifying, based on executing the application, the screen transmitted through the communication link to the preset screen.

For example, the combining may comprise identifying whether the information received from the wearable device includes a reference position associated with the pointer. The combining may comprise combining, in a first state that the information includes the reference position, the pointer in the screen based on the reference position among the reference position and a position of the contact point. The combining may comprise combining, in a second state different from the first state, the pointer in the screen based on the position of the contact point regarding the displaying area.

For example, the identifying may comprise identifying the reference position based on a direction of gaze of a user wearing the wearable device that is included in the information received from the wearable device.

For example, the combining the screen and the pointer may include transmitting a preset parameter to cease transmitting the information including the direction of the gaze to the wearable device.

For example, in the first state, the combining may include moving the pointer disposed in the reference position within the screen based on the movement of the contact point.

For example, the combining may include obtaining second coordinate values indicating a position of the pointer within the screen, based on first coordinate values indicating the position of the contact point in the displaying area, in the second state.

For example, the combining may include combining the pointer within the screen based on other information received from the external electronic device, in a state in which an external electronic device different from the wearable device is identified through the communication circuit.

As described above, according to an embodiment, a method of an electronic device may comprise displaying, by controlling a wearable device identified through a communication circuitry in the electronic device, at least portion of a first screen in a field-of-view (FoV) of the wearable device. The method may comprise displaying, while identifying that the at least portion of the first screen is displayed by the wearable device, a second screen for receiving a touch input associated with the first screen in a displaying area of a display of the electronic device. The method may comprise receiving first information for identifying a reference position of a pointer in the FoV from the wearable device. The method may comprise obtaining, in a first state identifying the reference position based on the received first information, a position of the pointer in the FoV based on the reference position and a position of a contact point of the touch input on the second screen. The method may comprise obtaining, in a second state different from the first state, a position of the pointer in the FoV based on the position of the contact point. The method may comprise transmitting, to the wearable device, second information for displaying the pointer in the first screen in the FoV based on the obtained position.

For example, the method may further comprise, in response to identifying a preset gesture based on the contact point on the displaying area, transmitting, to the wearable device, third information for displaying a preset screen based on the preset gesture in the FoV independent from identifying the position of the pointer.

For example, the identifying the position of the pointer based on the reference position and the position of the contact point may comprise identifying, from the first information, a first coordinate indicating the reference position in the FoV. The identifying the position of the pointer based on the reference position and the position of the contact point may comprise, in a state identifying the first coordinate, transmitting, to the wearable device, the second information for displaying the pointer on the first coordinate based on identifying the touch input on the displaying area.

For example, the transmitting the second information may comprise, based on identifying modification of the position of the contact point based on the touch input, transmitting, to the wearable device, the second information for moving the pointer displayed at the first coordinate based on the position of the contact point modified in the displaying area.

For example, the receiving may comprise identifying, based on a direction of gaze of a user wearing the wearable device that is identified from the first information, the reference position in the FoV.

For example, the receiving may comprise obtaining an image of an external space captured along a preset direction of the wearable device from the first information. The receiving may comprise identifying, based on identifying a preset body part in the obtained image, the reference position based on the identified position of the preset body part in the image.

For example, the transmitting may comprise, in the state identifying the position of the pointer based on the reference position, transmitting, to the wearable device, the second information including a preset parameter for at least temporary ceasing to transmit the first information indicating the reference position.

As described above, according to an embodiment, an electronic device may comprise a communication circuitry, a display, and a processor. The processor may be configured to execute, based on identifying a wearable device in a predetermined state through the communication circuitry, a preset mode for displaying a screen in field-of-view (FoV), of the wearable device based on the electronic device. The processor may be configured to receive, based on execution of the preset mode, information associated with the FoV from the wearable device. The processor may be configured to transmit, to the wearable device, the screen at least based on the received information by using a communication link established between the electronic device and the wearable device through the communication circuitry. The processor may be configured to receive, in a state transmitting the screen to the wearable device, an input indicating to change the screen transmitted through the communication link based on a touch input on a displaying area of the display. The processor may be configured to change, based on receiving the input indicating to display the preset screen, the screen transmitted through the communication link to the preset screen indicated by the input. The processor may be configured to combine, based on receiving the input indicating to display the pointer in the screen, the pointer and the screen based on a position of contact point of the touch input associated with the input and the received information.

For example, the processor may be configured to execute, based on receiving the input including a pre-registered gesture, an application corresponding to the preset screen corresponding to the pre-registered gesture. The processor may be configured to change, based on executing the application, the screen transmitted through the communication link, to the preset screen.

For example, the processor may be configured to identify whether the information received from the wearable device includes reference position associated with the pointer. The processor may be configured to, in a first state that the information includes the reference position, combine the pointer in the screen based on the reference position among the reference position and the position of the contact point. The processor may be configured to, in a second state different from the first state, combine the pointer in the screen based on the position of the contact point regarding the displaying area.

For example, the processor may be configured to identify, based on a direction of gaze of a user wearing the wearable device included in the information received from the wearable device, the reference position.

For example, the processor may be configured to transmit, to the wearable device, a preset parameter for ceasing to transmit the information including the direction of the gaze based on combining the pointer in the screen based on the reference position.

For example, the processor may be configured to in the second state, obtain, based on first coordinate values indicating the position of the contact point in the displaying area, second coordinate values indicating a position of the pointer in the screen.

For example, the processor may be configured to combine, in a state identifying an external electronic device different from the wearable device through the communication circuitry, the pointer in the screen based on another information received from the external electronic device.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. An electronic device, comprising:
a communication circuitry;
a display; and a processor, wherein the processor is configured to:
display, by controlling a wearable device identified through the communication circuitry, at least a portion of a first screen in a field-of-view (FoV) of the wearable device;
display, while identifying that the at least the portion of the first screen is displayed by the wearable device, a second screen for receiving a touch input associated with the first screen in a displaying area of the display;
receive first information for identifying a reference position of a pointer in the FoV from the wearable device;
obtain, in a first state identifying the reference position based on the first information received, a first pointer position of the pointer in the FoV based on the reference position and a position of a contact point of the touch input on the second screen;
obtain, in a second state different from the first state, a second pointer position of the pointer in the FoV based on the position of the contact point; and
transmit, to the wearable device, second information for displaying the pointer in the first screen in the FoV based on the first pointer position or the second pointer position.

2. The electronic device of claim 1, wherein the processor is configured to:
transmit, in response to identifying a preset gesture based on the contact point on the displaying area, third information for displaying a preset screen based on the preset gesture in the FoV independently from identifying the first pointer position or the second pointer position of the pointer to the wearable device.

3. The electronic device of claim 1, wherein the processor is configured to:
identify, from the first information, a first coordinate indicating the reference position in the FoV; and
transmit, based on identifying the touch input on the displaying area in a state identifying the first coordinate, the second information for displaying the pointer on the first coordinate to the wearable device.

4. The electronic device of claim 3, wherein the processor is configured to:
based on identifying modification of the position of the contact point based on the touch input, transmit, to the wearable device, the second information for moving the pointer displayed on the first coordinate based on the position of the contact point modified in the displaying area.

5. The electronic device of claim 1, wherein the processor is configured to:
identify, based on a direction of a gaze of a user wearing the wearable device that is identified from the first information, the reference position in the FoV; and
in the first state, transmit, to the wearable device, the second information for displaying the pointer based on the direction of the gaze.

6. The electronic device of claim 1, wherein the processor is configured to:
obtain an image of an external space captured along a preset direction of the wearable device from the first information;
identify, based on identifying a preset body part in the image obtained, a body part position of the preset body part identified in the image as the reference position; and
in the first state, transmit, to the wearable device, the second information for displaying the pointer on the body part position of the preset body part identified in the image that is identified as the reference position.

7. The electronic device of claim 1, wherein the processor is configured to:
in the first state identifying the first pointer position of the pointer based on the reference position, transmit, to the wearable device, the second information including a preset parameter for at least temporary ceasing to transmit the first information indicating the reference position.

8. The electronic device of claim 7, wherein the processor is configured to:
transmit, to the wearable device, the preset parameter for indicating deactivation of at least one camera disposed toward a pupil of a user of the wearable device.

9. The electronic device of claim 1, wherein the processor is configured to:
in response to receiving the first information different from the reference position, identify, based on a relationship between a first surface in the displaying area and a second surface viewable through the FoV, the first pointer position of the pointer in the second surface corresponding to the position of the contact point on the first surface.

10. The electronic device of claim 9, wherein the processor is configured to:
obtain, based on a first plane coordinates indicating the position of the contact point based on the first surface, a second plane coordinates indicating the first pointer position of the pointer in the second surface; and
transmit an image including the first pointer position at the second plane coordinates, to the wearable device based on the second information.

11. The electronic device of claim 1, wherein the processor is configured to:
receive, in a state identifying an external electronic device different from the wearable device through the communication circuitry, third information from the external electronic device; and
identify a third pointer position of the pointer in the FoV based on the third information received.

12. The electronic device of claim 11, wherein the processor is configured to:
identify first coordinate values indicated in a first preset axis based on the position of the contact point;
identify second coordinate values indicated in a second preset axis different from the first preset axis based on motion of the external electronic device indicated by the third information; and
identify the third pointer position of the pointer based on the first coordinate values and the second coordinate values.

13. The electronic device of claim 1, wherein the processor is configured to:
identify, from the first information received from the wearable device, a motion of the wearable device; and
select, in the displaying area formed by one or more applications executed by the processor, the at least the portion of the first screen to be displayed in the FoV based on the motion identified.

14. A method of an electronic device, comprising:
executing, based on identifying a wearable device in a predetermined state through a communication circuitry in the electronic device, a preset mode for displaying a screen in a field-of-view (FoV) of the wearable device based on the electronic device;

receiving, based on execution of the preset mode, information associated with the FoV from the wearable device;

transmitting, to the wearable device by using a communication link established between the electronic device and the wearable device through the communication circuitry, the screen at least based on the information received;

in a state transmitting the screen to the wearable device, receiving, based on a touch input on a displaying area of a display in the electronic device, an input indicating to modify the screen that is transmitted through the communication link;

modifying, based on receiving the input indicating to display a preset screen, the screen that is transmitted through the communication link to the preset screen indicated by the input; and combining, based on receiving the input indicating to display a pointer in the screen, the pointer and the screen based on a position of a contact point of the touch input associated with the input and based on the information received.

15. The method of claim 14, wherein the modifying comprises:

executing, based on receiving the input including a pre-registered gesture, an application corresponding to the preset screen in accordance with the pre-registered gesture; and modifying, based on executing the application, the screen transmitted through the communication link to the preset screen.

16. The method of claim 14, wherein the combining comprises:

identifying whether the information received from the wearable device includes a reference position associated with the pointer;

combining, in a first state that the information includes the reference position, the pointer in the screen based on the reference position and the position of the contact point; and combining, in a second state different from the first state, the pointer in the screen based on the position of the contact point regarding the displaying area.

17. The method of claim 16, wherein the identifying comprises:

identifying the reference position based on a direction of gaze of a user wearing the wearable device that is included in the information received from the wearable device.

18. A method of an electronic device, comprising:

displaying, by controlling a wearable device identified through a communication circuitry in the electronic device, at least a portion of a first screen in a field-of-view (FoV) of the wearable device;

displaying, while identifying that the at least the portion of the first screen is displayed by the wearable device, a second screen for receiving a touch input associated with the first screen in a displaying area of a display of the electronic device;

receiving first information for identifying a reference position of a pointer in the FoV from the wearable device;

obtaining, in a first state identifying the reference position based on the first information, a first pointer position of the pointer in the FoV based on the reference position and a position of a contact point of the touch input on the second screen;

obtaining, in a second state different from the first state, a second pointer position of the pointer in the FoV based on the position of the contact point; and transmitting, to the wearable device, second information for displaying the pointer in the first screen in the FoV based on the first pointer position or the second pointer position.

19. The method of claim 18, further comprises:

in response to identifying a preset gesture based on the contact point on the displaying area, transmitting, to the wearable device, third information for displaying a preset screen based on the preset gesture in the FoV independent from identifying the first pointer position or the second pointer position of the pointer.

20. The method of claim 18, wherein the identifying the first pointer position of the pointer based on the reference position and the position of the contact point comprises:

identifying, from the first information, a first coordinate indicating the reference position in the FoV; and in a state identifying the first coordinate, transmitting, to the wearable device, the second information for displaying the pointer on the first coordinate based on identifying the touch input on the displaying area.

\* \* \* \* \*